(12) United States Patent
Wright et al.

(10) Patent No.: US 8,707,158 B2
(45) Date of Patent: Apr. 22, 2014

(54) CUSTOMIZING A FORM IN A MODEL-BASED SYSTEM

(75) Inventors: Travis Wright, Sammamish, WA (US); Andrei Zenkovitch, Sammamish, WA (US); Andrew Forget, Penetanguishene (CA)

(73) Assignee: Microsoft Corporation, Redmond, WA (US)

( * ) Notice: Subject to any disclaimer, the term of this patent is extended or adjusted under 35 U.S.C. 154(b) by 511 days.

(21) Appl. No.: 12/613,246

(22) Filed: Nov. 5, 2009

(65) Prior Publication Data

US 2011/0035654 A1 Feb. 10, 2011

Related U.S. Application Data

(60) Provisional application No. 61/231,542, filed on Aug. 5, 2009.

(51) Int. Cl.
*G06F 17/00* (2006.01)

(52) U.S. Cl.
USPC .......................................... 715/223; 715/221

(58) Field of Classification Search
USPC ......................................... 715/221, 222, 223
See application file for complete search history.

(56) References Cited

U.S. PATENT DOCUMENTS

| | | | |
|---|---|---|---|
| 4,800,485 A * | 1/1989 | Ackroff et al. ......................... | 1/1 |
| 6,718,534 B1 | 4/2004 | Carter et al. | |
| 7,404,140 B2 * | 7/2008 | O'Rourke ..................... | 715/222 |
| 7,430,711 B2 * | 9/2008 | Rivers-Moore et al. ...... | 715/221 |
| 7,464,366 B2 | 12/2008 | Shukla et al. | |
| 7,475,000 B2 | 1/2009 | Cook et al. | |
| 7,584,417 B2 * | 9/2009 | Friend et al. .................. | 715/224 |
| 7,712,022 B2 * | 5/2010 | Smuga et al. ................. | 715/221 |
| 7,721,190 B2 * | 5/2010 | Sikchi et al. .................. | 715/223 |
| 7,725,814 B2 * | 5/2010 | Degtyar ........................ | 715/221 |
| 7,870,221 B2 * | 1/2011 | Matveief et al. .............. | 709/217 |
| 7,877,679 B2 * | 1/2011 | Ozana ........................... | 715/221 |
| 7,934,149 B1 * | 4/2011 | Raje .............................. | 715/221 |
| 7,934,150 B1 * | 4/2011 | Szonn et al. .................. | 715/221 |
| 8,019,664 B1 * | 9/2011 | Tifford et al. ................... | 705/31 |
| 8,060,818 B2 * | 11/2011 | Wang et al. .................... | 715/221 |
| 8,078,956 B1 * | 12/2011 | Feldman et al. .............. | 715/223 |
| 8,127,224 B2 * | 2/2012 | Vincent, III .................. | 715/222 |
| 8,200,780 B2 * | 6/2012 | Matveief et al. .............. | 709/217 |

(Continued)

OTHER PUBLICATIONS

Jayapandian et al., Expressive Query Specification through Form Customization, ACM 2008, pp. 416-427.*

(Continued)

*Primary Examiner* — Cong-Lac Huynh
(74) *Attorney, Agent, or Firm* — Jim Sfekas; Kate Drakos; Micky Minhas

(57) ABSTRACT

Techniques are described herein for customizing a form (a.k.a. a dialog) in a model-based system. For instance, the form may be customized without the need to modify the form in persistent memory, such as read-only memory (ROM), a hard disk, a magnetic disk, an optical disk, etc. A representation of a customization (e.g., an extensible markup language file, a management pack, etc.) regarding the form is captured in memory, such as a random access memory (RAM), and stored in a file or a database. For instance, the representation of the customization may be stored separately from the form. The representation of the customization is retrieved from the file or the database and applied to a rendering of the form.

20 Claims, 33 Drawing Sheets

(56) References Cited

U.S. PATENT DOCUMENTS

| | | | |
|---|---|---|---|
| 8,201,077 B2* | 6/2012 | Reddy et al. | 715/221 |
| 8,448,060 B2* | 5/2013 | Desmond et al. | 715/223 |
| 8,499,238 B2* | 7/2013 | Abrams et al. | 715/255 |
| 2002/0178213 A1* | 11/2002 | Parry | 709/203 |
| 2003/0110443 A1* | 6/2003 | Yankovich et al. | 715/501.1 |
| 2004/0039989 A1* | 2/2004 | Warren | 715/505 |
| 2004/0078374 A1* | 4/2004 | Hamilton | 707/10 |
| 2004/0085564 A1* | 5/2004 | Peavey et al. | 358/1.13 |
| 2004/0090950 A1* | 5/2004 | Lauber et al. | 370/352 |
| 2004/0181534 A1* | 9/2004 | Mortensen et al. | 707/100 |
| 2005/0071752 A1* | 3/2005 | Marlatt | 715/506 |
| 2006/0007189 A1* | 1/2006 | Gaines et al. | 345/179 |
| 2006/0031757 A9* | 2/2006 | Vincent | 715/513 |
| 2006/0168527 A1* | 7/2006 | Kelkar et al. | 715/744 |
| 2006/0174199 A1 | 8/2006 | Soltis et al. | |
| 2007/0101256 A1* | 5/2007 | Simonyi | 715/511 |
| 2007/0245227 A1* | 10/2007 | Hyland et al. | 715/505 |
| 2007/0260475 A1* | 11/2007 | Bhanote | 705/1 |
| 2008/0010591 A1* | 1/2008 | Good et al. | 715/255 |
| 2008/0065978 A1* | 3/2008 | Francker et al. | 715/223 |
| 2008/0092060 A1 | 4/2008 | Berg et al. | |
| 2008/0126396 A1* | 5/2008 | Gagnon | 707/102 |
| 2008/0155391 A1* | 6/2008 | Sattler et al. | 715/223 |
| 2008/0250308 A1* | 10/2008 | Walsh et al. | 715/223 |
| 2008/0313728 A1* | 12/2008 | Pandrangi et al. | 726/12 |
| 2010/0027959 A1* | 2/2010 | Obama | 386/52 |
| 2010/0153881 A1* | 6/2010 | Dinn | 715/825 |
| 2010/0287459 A1* | 11/2010 | Mital et al. | 715/221 |
| 2011/0035655 A1* | 2/2011 | Heineken | 715/223 |
| 2011/0113319 A1* | 5/2011 | Saft et al. | 715/223 |
| 2011/0126088 A1* | 5/2011 | Stuart | 715/206 |
| 2011/0131479 A1* | 6/2011 | Padgett et al. | 715/223 |
| 2011/0131480 A1* | 6/2011 | Matveief et al. | 715/224 |
| 2011/0246868 A1* | 10/2011 | Stanciu et al. | 715/223 |
| 2012/0166928 A1* | 6/2012 | Stern et al. | 715/223 |
| 2012/0260200 A1* | 10/2012 | Delancy et al. | 715/762 |
| 2013/0064525 A1* | 3/2013 | Cary et al. | 386/285 |

OTHER PUBLICATIONS

Shabdar, Manage Your People, Google 2009 , pp. 533-592.*
Tsichritzis, Form Management, ACM 1982, pp. 453-478.*
Morgan, Form Management, ACM 1982, pp. 453-478.*
Novak Jr., Composing Reusable Software Components through Views, IEEE 1994, pp. 39-47.*
"Zoho Creator Features", retrieved at <<http://zohocreator.wiki.zono.com/Zoho-Creator-Features.html>>, Aug. 7, 2009, pp. 4.
"Form Editor (XMod 4)", retrieved at <<http://dnndev.com/help/xmod/Form_Editor_(XMod_4).htm>>, Aug. 7, 2009, pp. 5.
"Custom Design-time Control Features in Visual Studio .NET", retrieved at <<http://msdn.microsoft.com/en-us/magazine/cc164048.aspx>>, Aug. 7, 2009, pp. 12.
"Matisse4MyEclipse Swing UI Designer", retrieved at <<http://www.myeclipseide.com/module-htmlpages-display-pid-5.html>>, Aug. 7, 2009, pp. 5.
"Aplicor", retrieved at <<http://www.aplicor.com/product_advantages.htm>> on Aug. 7, 2009, 3 Pages.

* cited by examiner

COMPUTER IDENTITY

FULLY QUALIFIED DOMAIN NAME (FQDN):

PRIMARY USER:

DNS COMPUTER NAME:

DNS DOMAIN NAME:

NETBIOS COMPUTER NAME:

NETBIOS DOMAIN NAME:

IP ADDRESS:

MAC ADDRESS:

SECURITY IDENTIFIER (SID):

ACTIVE DIRECTORY SITE:

SMBIOS ASSET TAG:

ASSET TAG:

SERIAL NUMBER:

⎫
⎬ 202A
⎭

OPERATING SYSTEM

OPERATING SYSTEM:

BUILD NUMBER:

SYSTEM DRIVE:

SERIAL NUMBER:

MANUFACTURER:

OPERATING SYSTEM LANGUAGE:

CUSTOMIZING A FORM IN A MODEL-BASED SYSTEM

CROSS-REFERENCE TO RELATED APPLICATIONS

This application claims the benefit of U.S. Provisional Application No. 61/231,542, filed Aug. 5, 2009, the entirety of which is incorporated by reference herein.

BACKGROUND

Many modern software products have a presentation layer that includes a series of forms, which provide information regarding objects that are stored in a database. Such forms typically enable a user to view and edit the information regarding the objects. For example, data about a company's computers may be stored in a database. A form may be created to show information about those computers, such as the name, manufacturer, date of purchase, value, location, primary user, etc. of each of the computers.

In an extensible model-based system, a software vendor may provide an out-of-the-box solution, which describes the normal properties and relationships of a given class of objects (e.g., a computer) and a form that corresponds to the class of objects in the model on which the system is based. Users can then extend the model to add additional relationships and properties. The form is usually modified (i.e., customized) to show the additional relationships and properties, so that a user can see and edit them. For example, a user can modify the form by adding controls, rearranging controls, re-labeling the controls, changing colors, changing fonts, adding validation logic, etc. In another example, the customer may modify the form by removing controls that are provided with respect to the out-of-the-box solution.

Conventional techniques for generating a customized form often result in a new form being created, typically starting out as a copy of the original form, even when the customized form includes only a slight modification with respect to the original form. Once a customer has departed from the original form and created a new customized form, the original software vendor traditionally is no longer able to update the customized form in a future version of the software on which the form is based. Accordingly, the customer often chooses between continuing to use the customized version of the form "as is" without the software vendor's updates, modifying the customized version of the form to account for the updates, or reverting all customizations and using the new version of the form from the software vendor.

Some example software programs that implement such conventional techniques for generating a customized form include Remedy™ developed by BMC Software, Inc., HEAT® developed by FrontRange Solutions, Inc., and Microsoft Dynamics® CRM developed by Microsoft Corporation. Form designers/editors, such as Microsoft® Visual Studio®, Microsoft® Expression Blend™, and Microsoft® Office InfoPath™, may also be used to generate customized forms.

Customizing forms to match a customer's business processes typically involves substantial effort. Moreover, substantial time is usually spent on reconfiguring a form to include its corresponding customizations each time the software is upgraded. This slows the adoption rate of new versions of the software and can cause customer frustration. Furthermore, the customizations are often initially applied in a test environment and then manually applied in a production environment. Such an approach may be time consuming, frustrating, and/or error prone.

SUMMARY

Various approaches are described herein for, among other things, customizing a form (a.k.a. a dialog) in a model-based system. For instance, the form may be customized without the need to modify the form in persistent memory. The persistent memory may include read-only memory (ROM), a hard disk, a magnetic disk, an optical disk, or any other suitable persistent memory. A representation of a customization (e.g., an extensible markup language (XML) file, a management pack, etc.) regarding the form may be captured in memory, such as a random access memory (RAM), and stored in a file or a database. For instance, the representation of the customization may be stored separately from the form. The representation of the customization may be in any suitable format (e.g., an extensible markup language (XML) file, a management pack, etc.). The representation of the customization may be retrieved from the file or the database and applied to a rendering of the form.

A "what you see is what you get" (WYSIWYG) interface may be provided to a user to enable the user to modify a visual representation of the form. For instance, the user may modify properties of the form and/or properties of controls that are included in the form. A control is an interface element that is associated with a designated functionality regarding data that is included in a form. Examples of a control include but are not limited to a text box, a list box, etc. Representations of the modifications are captured, so that they may be applied to a rendering of the form.

Example methods are described for customizing a form in a model-based system. In a first example method, a representation of a user interface customization regarding a declaratively-defined form is captured. A declaratively-defined form is a form that is defined using a declarative programming language, as opposed to an imperative programming language. The representation of the user interface customization is serialized to facilitate distribution thereof. The serialized representation of the user interface customization is retrieved. The user interface customization is applied with respect to a rendering of the form.

In a second example method, a representation of a customization regarding a declaratively-defined form is captured. The customization is implemented with respect to the form without changing the form in persistent storage. A visual representation of the form is provided that includes the customization.

Example systems are also described. A first example system includes a capture module, a serialization module, a retrieval module, and an application module. The capture module is configured to capture a representation of a user interface customization regarding a declaratively-defined form. The serialization module is configured to serialize the representation of the user interface customization to facilitate distribution thereof. The retrieval module is configured to retrieve the serialized representation of the user interface customization. The application module is configured to apply the user interface customization with respect to a rendering of the form.

A second example system includes a capture module, an implementation module, and a providing module. The capture module is configured to capture a representation of a customization regarding a declaratively-defined form. The implementation module is configured to implement the customization with respect to the form without changing the form in persistent storage. The providing module is configured to provide a visual representation of the form that includes the customization based on implementation of the customization with respect to the form.

Example computer program products are also described. A first example computer program product includes a computer-readable medium having computer program logic recorded thereon for customizing a form in a model-based system. The computer program product includes first, second, third, and fourth program logic modules. The first program logic module is for enabling the processor-based system to capture a representation of a user interface customization regarding a declaratively-defined form. The second program logic module is for enabling the processor-based system to serialize the representation of the user interface customization to facilitate distribution thereof. The third program logic module is for enabling the processor-based system to retrieve the serialized representation of the user interface customization. The fourth program logic module is for enabling the processor-based system to apply the user interface customization with respect to a rendering of the form.

A second example computer program product includes a computer-readable medium having computer program logic recorded thereon for customizing a form in a model-based system. The computer program product includes first, second, and third program logic modules. The first program logic module is for enabling the processor-based system to capture a representation of a customization regarding a declaratively-defined form. The second program logic module is for enabling the processor-based system to implement the customization with respect to the form without changing the form in persistent storage. The third program logic module is for enabling the processor-based system to provide a visual representation of the form that includes the customization.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Moreover, it is noted that the invention is not limited to the specific embodiments described in the Detailed Description and/or other sections of this document. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present invention and, together with the description, further serve to explain the principles involved and to enable a person skilled in the relevant art(s) to make and use the disclosed technologies.

FIG. 2 depicts an example form that may be customized in accordance with embodiments.

Figure 1:
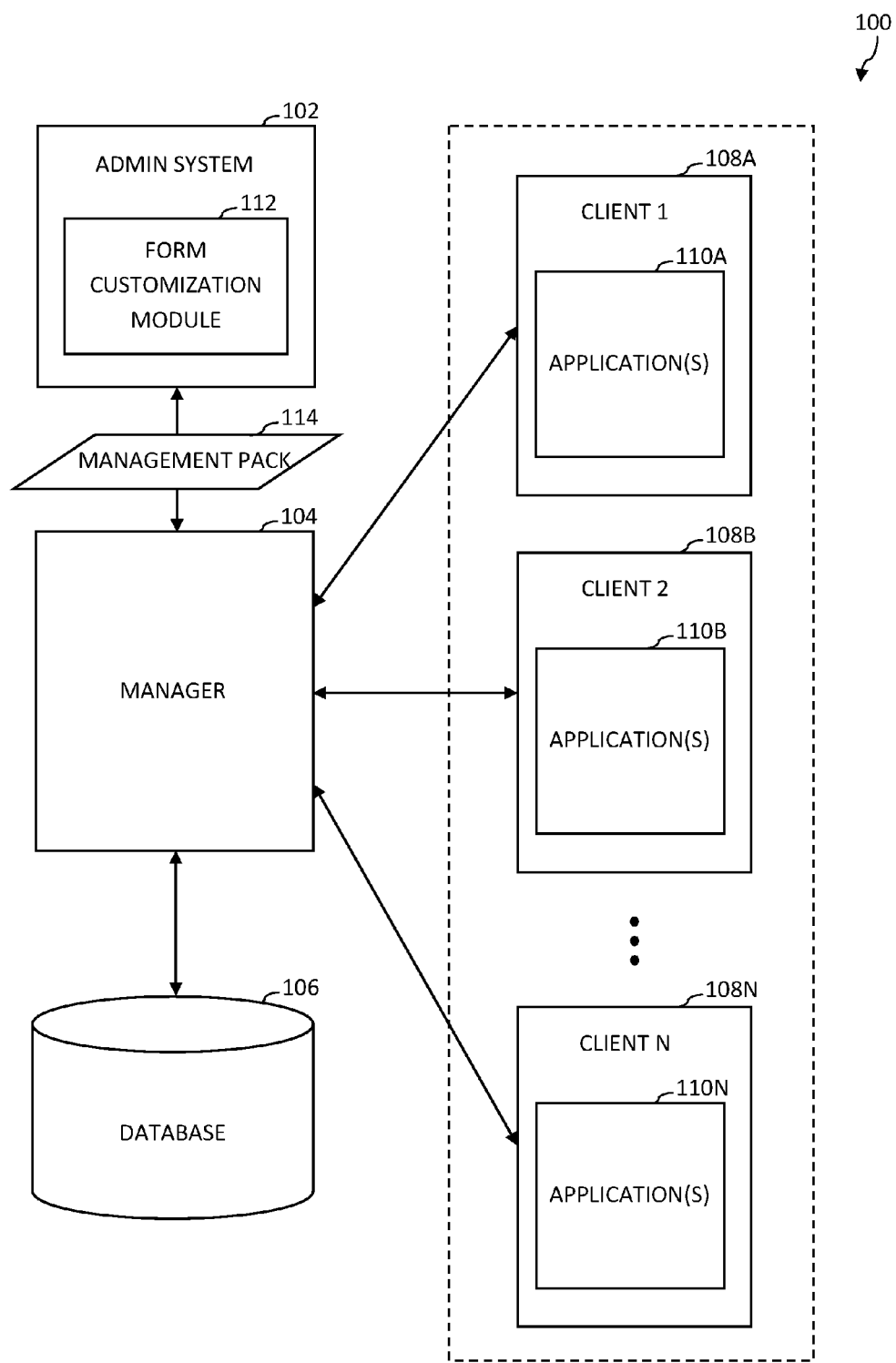
FIG. 1 is a block diagram of an example computer network in accordance with an embodiment.

FIGS. 4, 6, 8, 10, 12, 14, 16, 18, 20, 22, 24, 26, 28, 30, and 32 are block diagrams of example implementations of a manager shown in FIG. 1 in accordance with embodiments.

FIGS. 5, 7, 9, 11, 13, 15, 17, 19, 21, 23, 25, 27, and 31 depict flowcharts of methods for customizing a form in a model-based system in accordance with embodiments.

Figure 29:
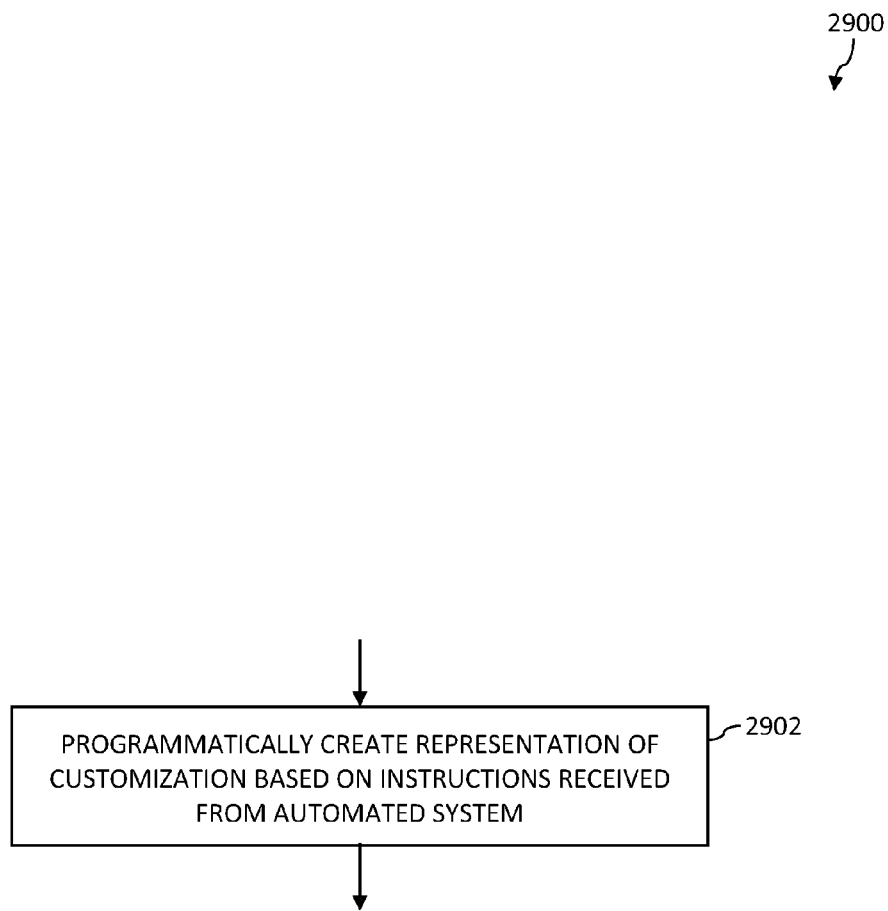

FIG. 29 depicts a flowchart of a method for creating a representation of a customization regarding a form in accordance with an embodiment.

Figure 33:
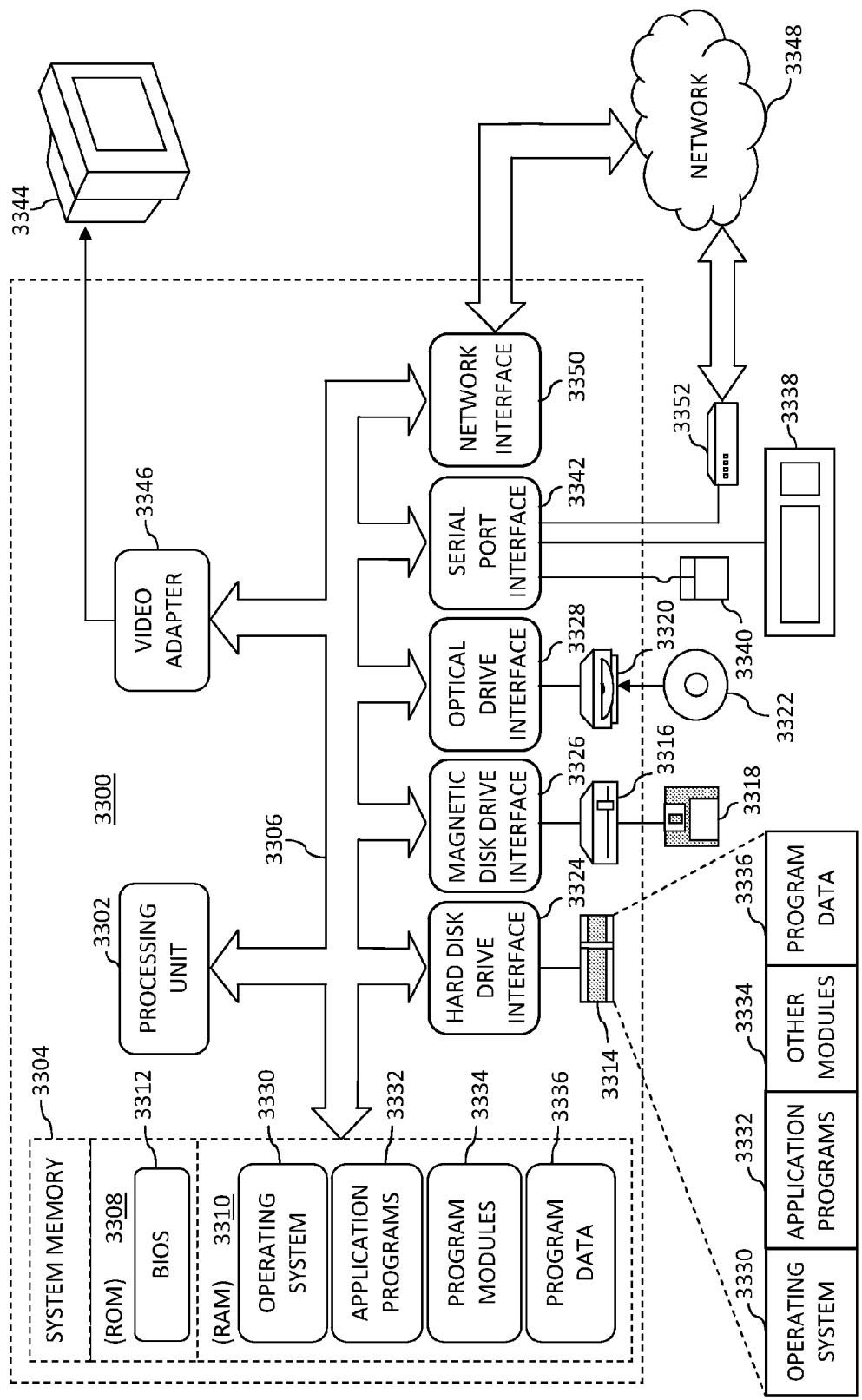

FIG. 33 depicts an example computer in which embodiments may be implemented.

The features and advantages of the disclosed technologies will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the relevant art(s) to implement such feature, structure, or characteristic in connection with other embodiments whether or not explicitly described.

Example embodiments are capable of customizing a form (a.k.a. a dialog) in a model-based system. For instance, the form may be customized without the need to modify the original form in persistent memory. The persistent memory may include read-only memory (ROM), a hard disk, a magnetic disk, an optical disk, or any other suitable persistent memory. In some example embodiments, a representation of a customization regarding the form is captured in memory, such as a random access memory (RAM), and stored in a file or a database. For instance, the representation of the customization may be stored separately from the form.

The representation of the customization may be in any suitable format, including but not limited to an extensible markup language (XML) file, a management pack, etc. A management pack is business logic expressed in terms of an extensible language, such as extensible markup language (XML). A management pack includes one or more management pack elements. A management pack element includes information regarding an entity in a system, such as a description of the entity, operation(s) to be performed with respect to the entity, etc. Entities can be computers, software programs, employees, customers, or anything else in the system that an administrator may wish to describe. The representation of the customization is retrieved from the file or the database and applied to a rendering of the form.

Some example embodiments provide a "what you see is what you get" (WYSIWYG) interface to a user to enable the user to modify a visual representation of the form. For instance, the user may modify properties of the form and/or properties of controls that are included in the form. A control is an interface element that is associated with a designated function regarding data that is included in a form. Examples of a control include but are not limited to a text box, a list box, etc. Representations of the modifications are captured, so that they may be applied to a rendering of the form. Capturing these representations in a file enables an administrator to define the customizations once and to apply the customizations in multiple installations of a manager for consistency. Example managers are discussed below with respect to FIGS. 4, 6, 8, 10, 12, 14, 16, 18, 20, 22, 24, 26, 28, 30, and 32.

Some example embodiments may eliminate the need to create a new form when an original form is customized. A form that is customized in accordance with the example techniques described herein may be updated in a future version of the software that is used to provide the form. For instance, the techniques may eliminate the need to reconfigure the form to include its previous customizations each time the software is upgraded. In some example embodiments, representations of customizations that are applied in a test environment are imported to a production environment, which may eliminate the need to manually apply the customizations in the production environment.

In accordance with some example embodiments, representations of customizations regarding a form are stored in a database and transmitted over a communication channel to computer(s) or other processing system(s) where the form is to be displayed. This is advantageous compared to conventional form customization techniques because it requires no file distribution or .dll registration on the computer(s) that are to display the form.

II. Example Embodiments for Customizing a Form in a Model-Based System

FIG. 1 is a block diagram of an example computer network 100 in accordance with an embodiment. Generally speaking, computer network 100 operates to deploy configuration information that may be helpful for monitoring and managing clients in computer network 100, applications deployed thereon, information technology (IT) services, and/or other managers in computer network 100. Forms (a.k.a. dialogs) are used to facilitate monitoring and managing operations that are performed by computer network 100. In accordance with example embodiments, computer network 100 is configured to apply customizations to such forms prior to rendering the forms. For instance, the customizations may be applied to the forms without the need to modify the forms in persistent memory.

As shown in FIG. 1, computer network 100 includes an administrator (admin) system 102, a manager 104, a database 106, and a plurality of clients 108A-108N. Communication among admin system 102, manager 104, database 106, and clients 108A-108N may be carried out over a wide area network, such as the Internet, using well-known network communication protocols. Additionally or alternatively, the communication may be carried out over a local area network (LAN) or another type of network.

Admin system 102 is a computer or other processing system, including one or more processors, which is configured to provide management packs (e.g., management pack 114) or other suitable representations of information to manager 104 at the direction of an administrative user who has access to admin system 102. For instance, the administrative user may author and import a management pack to manager 104 using an interface client (e.g., a Web browser, an integrated development environment (IDE) shell application, etc.) that is installed on admin system 102. Admin system 102 includes a form customization module 112 that is configured to generate a management pack (e.g., management pack 114) or other suitable representation of information that defines customizations with respect to a form. Admin system 102 provides the management pack to manager 104 for further processing.

Manager 104 is at least one computer (e.g., server) or other processing system that is configured to distribute forms, forum customization, and the data to display in those forms. Manager 104 may be any suitable type of manager. For instance, partners, such as integrators or independent software vendors (ISVs), can provide customizations as a part of an offering to customers.

Manager 104 is configured to validate management packs (or other suitable representations of information) that are received from admin system 102 and to provide the management packs to database 106. One type of management pack that manager 104 receives from admin system 102 is a "form customization management pack" (FCMP). A FCMP defines customization(s) with respect to a form.

Database 106 is at least one storage device that stores instances of customizations that are defined by management packs (or other suitable representations). Database 106 may be a structured query language (SQL) database, a relational database, or any other suitable type of database.

Clients 108A-108N are computers or other processing systems that execute respective form host applications. For instance, client 108A executes application(s) 110A, client 108B executes application(s) 110B, and so on. Manager 104 may communicate directly with clients 108A-108N, though the scope of the example embodiments is not limited in this respect.

In accordance with example embodiments, a management pack (or other suitable representation of information) is used to deliver a solution that includes forms, workflows, etc. Another management pack is used as a container for storing customization(s) that a customer supplies on top of that solution. For instance, when a software vendor releases a management pack that provides a solution, that management pack may be "sealed", meaning that the management pack cannot be modified by anyone. Example embodiments enable a form to be customized even if the form is included in a sealed management pack without actually modifying the form in the sealed management pack. For instance, when a customer customizes a form in accordance with any one or more of the techniques described herein, the customizations may be included in another unsealed or sealed management pack, which is referred to as a customization management pack.

The sealed management pack that includes the form and the customization management pack that includes the customizations may be used to render a customized version of the form that includes the customizations from the customization management pack. It should be noted that management packs may have respective indicators (e.g., binary flags, certificates, etc.) that an application programming interface (API) can use to determine whether the management packs can be modified.

Customizations regarding a form may be programmatically created using a programming interface, though the scope of the example embodiments is not limited in this respect. For instance, some example embodiments provide an interface (e.g., a graphical user interface) via which a user may view and modify data that is included in a visual representation of a form. For example, the user interface may be provided using an interface client (e.g., a Web browser, an integrated development environment (IDE) shell application, etc.) that is installed on admin system 102 or any of clients 108A-108N.

Customizations may be captured in a portable format, such as an extensible markup language (XML) file, though the scope of the example embodiments is not limited in this respect. The customizations are applied to the underlying base form prior to displaying the form to the user. The base form may be modified or "upgraded" by a software vendor who provides the form, for example, and the customizations will still be applied to the modified or upgraded form as much as they are applicable. Moreover, customizations may be additive. For example, one person can customize a form in one way and another person can customize the form in a different way. Using a selection algorithm, the customizations can be effectively merged to result in combination of the customizations to be applied. The customizations can be distributed on demand over a communication channel between computers or other processing systems (e.g., between manager 104 and any of clients 108A-108N).

When a form is loaded in computer network 100, manager 104 may determine whether customizations regarding the form exist. For instance, the form may be defined in the model-based system and associated with a designated class of objects. When clients 108A-108N need to view or edit data of the designated class of objects, manager 104 supplies the customizations regarding the form that is associated with the designated class of objects to the clients 108A-108N. Multiple versions of a customization may exist, though no more than one version of each customization is used in computer network 100 at any given time. For instance, if a first version of a customization is being used in computer network 100, and a second version of the customization is imported into computer network 100, the second version overwrites the first version.

Computer network 100 is described as using management packs to represent information for illustrative purposes and is not intended to be limiting. It will be recognized by persons skilled in the relevant art(s) that computer network 100 may utilize any suitable representation of information.

FIG. 2 depicts an example form 200 that may be customized in accordance with embodiments. Form 200 includes interface elements 202A and 202B. Interface elements 202A are directed to the identity of a computer. Interface elements 202B are directed to the operating system of the computer. Each of the interface elements 202A and 202B may be defined as a property or a relationship. Fully qualified domain name (FQDN), domain name system (DNS) domain name, Internet Protocol (IP) address, and operating system are some examples of properties of a computer class that are shown in form 200. Primary user is an example of a relationship of the computer class. Such properties and relationships may be shown in read-only or read-write format. The properties and relationships shown in form 200 are depicted in read-only format for illustrative purposes, such that a user may enter values for the properties and relationships.

A user may customize form 200 in real time using a user interface (e.g., a what-you-see-is-what-you-get (WYSIWYG) interface) that is provided by admin system 102 or any of clients 108A-108N. Example customizations that may be performed with respect to form 200 include but are not limited to adding a control, renaming a label, moving a control, hiding a control, deleting a control, changing validation logic, changing display properties of a control (e.g., background color, size, etc.), changing data binding of a control, setting a default value, etc.

Two example scenarios will be described for customizing a form, such as form 200, for illustrative purposes. In a first scenario, layout (a.k.a. format) changes are made with respect to the form. Examples of layout changes include but are not limited to moving a control from one place to another in the form, hiding a control, changing a color of text, changing a background color, changing text labels, etc. In a second scenario, data changes are made with respect to the form. Examples of data changes include but are not limited to adding a new control and binding it to a new source of data, changing the binding of a control from one source to another, changing the data validation logic for a control, etc.

Layout changes are captured when a user selects a control and then performs an action with respect to the control. For example, after selecting a control using an input device, such as a mouse, the user can "drag" the control to a new location using the user interface. In another example the user may select a control and then in a "properties dialog" edit one or more properties (e.g., text color, background color, text labels, etc.) of the control. The user can also use keyboard keys such as the "Delete" key to delete an object, the arrow keys to move a control, etc. The user can also use "Cut", "Copy", and "Paste" commands typically found in graphical user interfaces to manipulate the layout of the controls.

When a user performs actions, such as those described above, a "recording" of the actions is stored automatically in memory as a set of objects that describe the recorded actions. Thereafter, when the recording is to be stored, the objects are serialized into a suitable format (e.g., XML format), which makes the customizations transportable in a file. Alternatively, the recording of the actions may be stored automatically in the transportable format (e.g., XML format).

Data changes typically occur when a database (e.g., database 106) is customized by a user to add additional kinds of data by creating extensions to the model and importing them into the system. For example, a customer may add an additional property to the model to capture the dollar value of a computer and to capture whether or not the computer is owned by the company (versus being leased). When these extensions are imported into the database, the corresponding schema modifications are added to store the additional data.

The customer may want to modify the form to display the additional data and allow it to be edited by users. For example, the customer may do this by displaying an additional textbox to capture the dollar value and a checkbox to indicate ownership. The textbox may have validation, so that only a number within a designated range (e.g., between 500 and 10,000) can be entered.

Two example techniques are described below for displaying an additional textbox and a checkbox, as mentioned above. In a first example, the user interface may include a visual representation of a form (referred to as "the form design surface"), a "toolbox" of controls, and a properties dialog window that includes a list of properties that are defined in the model. The customer may drag a textbox and a checkbox from the toolbox of controls onto the form design surface. The customer may then select the property in the properties dialog window that is to be associated with the textbox and the checkbox. Associating the textbox and the checkbox with the property is said to "bind" the property to the textbox and the checkbox.

In a second example, the customer may drag the property from the properties dialog window onto the form design surface. A type of control that corresponds to the data type of the property may be automatically added to the form. For instance, if the data type of the property is string or integer, a textbox may be added. If the data type of the property is Boolean, a checkbox may be added. In these example techniques, a new control is added to the form and bound to the data source automatically.

As with the layout and format customizations described above, data changes may be stored automatically in XML. A relationship is created between the base form and the form customizations. When a form host (e.g., manager 104 of FIG. 1) is instructed by an application to render a form, the form host checks to see whether there are customizations related to that form. If there are customizations, the form host starts at the beginning of the customizations and one by one "replays" the recorded customizations by modifying the form. When all of the customizations are complete, the form is rendered to the user in its customized state.

Example XML code is provided below to show an example representation of some customizations that may be applied to a form. As shown in the code, an element named "LayoutRoot/Index 1" is moved to location X="39", Y="−35" in the form. An element named "LayoutRoot/Index 0" is moved to location X="39", Y="−31" in the form. The foreground color of "LayoutRoot/Index 0" is changed to the color represented by the hexadecimal number "#FF808080". "LayoutRoot/Index 0" is disabled by changing the value of the property "IsEnabled" that is associated with "LayoutRoot/Index 0" to "False". The foreground color of "LayoutRoot/Index 1" is changed to the color represented by the hexadecimal number "#FF808080". "LayoutRoot/Index 1" is disabled by changing the value of the property "IsEnabled" that is associated with "LayoutRoot/Index 1" to "False". These example customizations are provided for illustrative purposes and are not intended to be limiting. Persons skilled in the relevant art(s) will recognize that the representation may include any suitable customizations regarding the form.

```xml
<Presentation>
    <Forms>
        <Form ID="System.AddUserForm" Accessibility="Public"
        Target="WoodGrove.AutomatedActivity.AddUserToADGroupProjection"
        Assembly="AutomatedActivityAddUserToGroupFormAssembly"
    <Move X="39" Y="-35">
        <Element Name="LayoutRoot/Index:1"/>
    </Move>
    <Move X="39" Y="-31">
        <Element Name="LayoutRoot/Index:0"/>
    </Move>
    <PropertyChange Object="LayoutRoot/Index:0" Property="Foreground">
        <NewValue>#FF808080</NewValue>
    </PropertyChange>
    <PropertyChange Object="LayoutRoot/Index:0" Property="IsEnabled">
        <NewValue>False</NewValue>
    </PropertyChange>
    <PropertyChange Object="LayoutRoot/Index:1" Property="Foreground">
        <NewValue>#FF808080>/NewValue>
    </PropertyChange>
    <PropertyChange Object="LayoutRoot/Index:1" Property="IsEnabled">
        <NewValue>False</NewValue>
    </PropertyChange>
</Customization></Form>
    <Forms>
```

More example XML code is provided below to show an example representation of some other customizations that may be applied to a form. As shown in the code, the foreground color of a control named "IncidentTime" is changed to black. A new control named "System.Controls.Picture" is added. The property to which a control named "IncidentType" is bound is changed to "type1\property3\property2".

```xml
<?xml>
<Form Customization>
    <Information>
        <Form>Forms.INcidentResponse</Form>
        <Author>John Smith (jsmith@fabrikan.com) </Author>
        <Signature>
        <Version>1.0.0.0</Version>
    </Information>
    <Actions>
        <Alteration control="IncidentTime">
            <Property name="ForeColor" value="Color.Black" />
        </Alteration>
        <NewControl type="System.Controls.Picture" assembl="xxx" >
            <Property name="Name" value="Picture1" />
            <Property name="Parent" value=" {form}" />
            <Property name="ZOrder" value="0" />
            <Property name="Image" value="xxx" />
        </NewControl>
        <Alteration control="IncidentType">
```

```
      <Property name="Binding" value="type1\property3\property2" />
    </Alteration>
  </Actions>
</Form Customization>
```

Any of the example XML code above may be included in a management pack, for example, and stored in a database (e.g., database 106) or a file, so that the customizations included therein may be applied with respect to a rendering of the form.

Form 200 and interface elements 202A and 202B are provided for illustrative purposes and are not intended to be limiting. A form may pertain to any suitable subject matter and may include any suitable interface elements.

Figure 3:
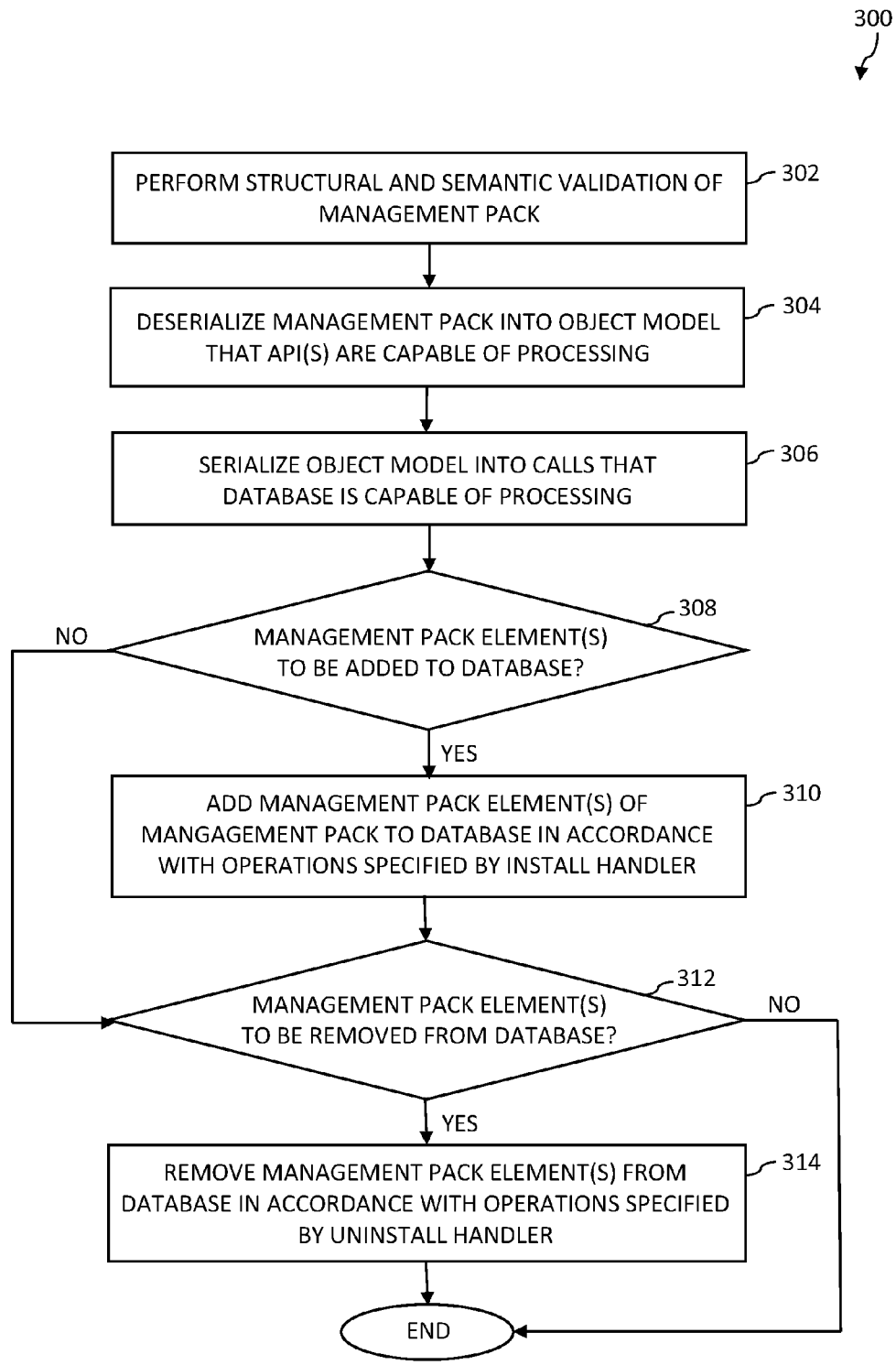
FIG. 3 depicts a flowchart of a method for importing a management pack into a database in accordance with an embodiment.

FIG. 3 depicts a flowchart 300 of a method for importing a management pack into a database (e.g., database 106) in accordance with an embodiment. Flowchart 300 is described from the perspective of a manager. Flowchart 300 may be performed by manager 104 of computer network 100 shown in FIG. 1, for example. For illustrative purposes, flowchart 300 is described with respect to a manager 104' shown in FIG. 4, which is an example of manager 104, according to an embodiment. In this document, whenever a prime is used to modify a reference number, the modified reference number indicates an example (or alternate) implementation of the element that corresponds to the reference number.

Figure 4:
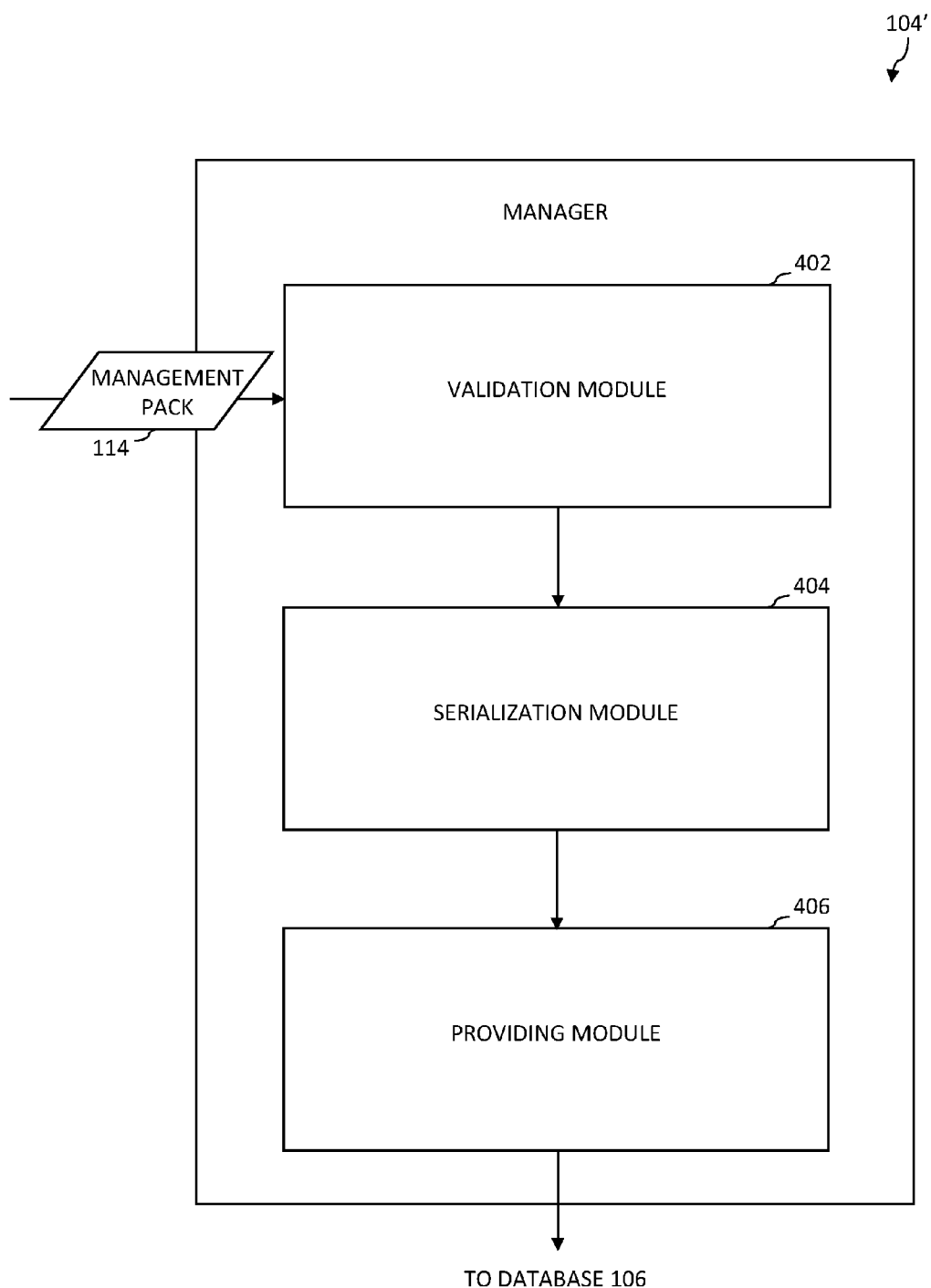

As shown in FIG. 4, manager 104' includes a validation module 402, a serialization module 404, and a providing module 406. Further structural and operational embodiments will be apparent to persons skilled in the relevant art(s) based on the discussion regarding flowchart 300. Flowchart 300 is described as follows.

As shown in FIG. 3, the method of flowchart 300 begins at step 302. In step 302, a structural and semantic validation of a management pack is performed. In an example implementation, validation module 402 of FIG. 4 performs the structural and semantic validation of management pack 114.

At step 304, the management pack is de-serialized into an object model that application programming interface(s) (APIs) are capable of processing. For instance, the API(s) may be present on respective clients (e.g., clients 108A-108N) of a system (e.g., computer network 100). In an example implementation, serialization module 404 de-serializes management pack 114 into the object model.

At step 306, the object model is serialized into calls that a database (e.g., database 106 is capable of processing. In an example implementation, serialization module 404 serializes the object model into the calls to the database.

At step 308, a determination is made as to whether management pack element(s) are to be added to the database. If no management pack elements are to be added to the database, control flows to step 312. However, if management pack element(s) are to be added to the database, control flows to step 310. In an example implementation, providing module 406 determines whether management pack element(s) are to be added to the database.

For example, management pack elements that are included in the management pack may be compared to management pack elements that are present in the database to determine whether the management pack includes element(s) that are not present in the database. If the management pack includes element(s) that are not present in the database, a determination may be made to add those elements to the database. Otherwise, a determination may be made not to add elements to the database.

At step 310, management pack element(s) of the management pack are added to the database in accordance with operations specified by an install handler. An install handler is a module (e.g., software module) that is configured to add management pack elements to a database. In accordance with an example implementation, providing module 406 adds management pack element(s) of management pack 114 to the database.

At step 312, a determination is made as to whether management pack element(s) are to be removed from the database. If no management pack elements are to be removed from the database, the method of flowchart 300 ends. However, if management pack element(s) are to be removed from the database, control flows to step 314. In an example implementation, providing module 406 determines whether management pack element(s) are to be removed from the database.

For example, management pack elements that were previously included in the management pack may be present in the database. One or more of those management pack elements may have been removed from the management pack in the interim. The current management pack elements of the management pack may be compared to the management pack elements that are present in the database. A determination may be made to remove management pack element(s) that are present in the database that are not currently included in the management pack. Accordingly, the management pack elements that are stored in the database may be updated to reflect the management pack elements that are currently included in the management pack. However, if the management pack elements that are stored in the database are the same as the management pack elements that are currently included in the management pack, a determination may be made that no management pack elements are to be removed from the database.

At step 314, management pack element(s) of the management pack are removed from the database in accordance with operations specified by an uninstall handler. An uninstall handler is a module (e.g., software module) that is configured to remove management pack elements from a database. In accordance with an example implementation, providing module 406 removes management pack element(s) of management pack 114 from the database. FIG. 3 illustrates one example technique of importing a management pack into a database and is not intended to be limiting. Other suitable techniques are within the spirit and scope of the example embodiments.

Figure 5:
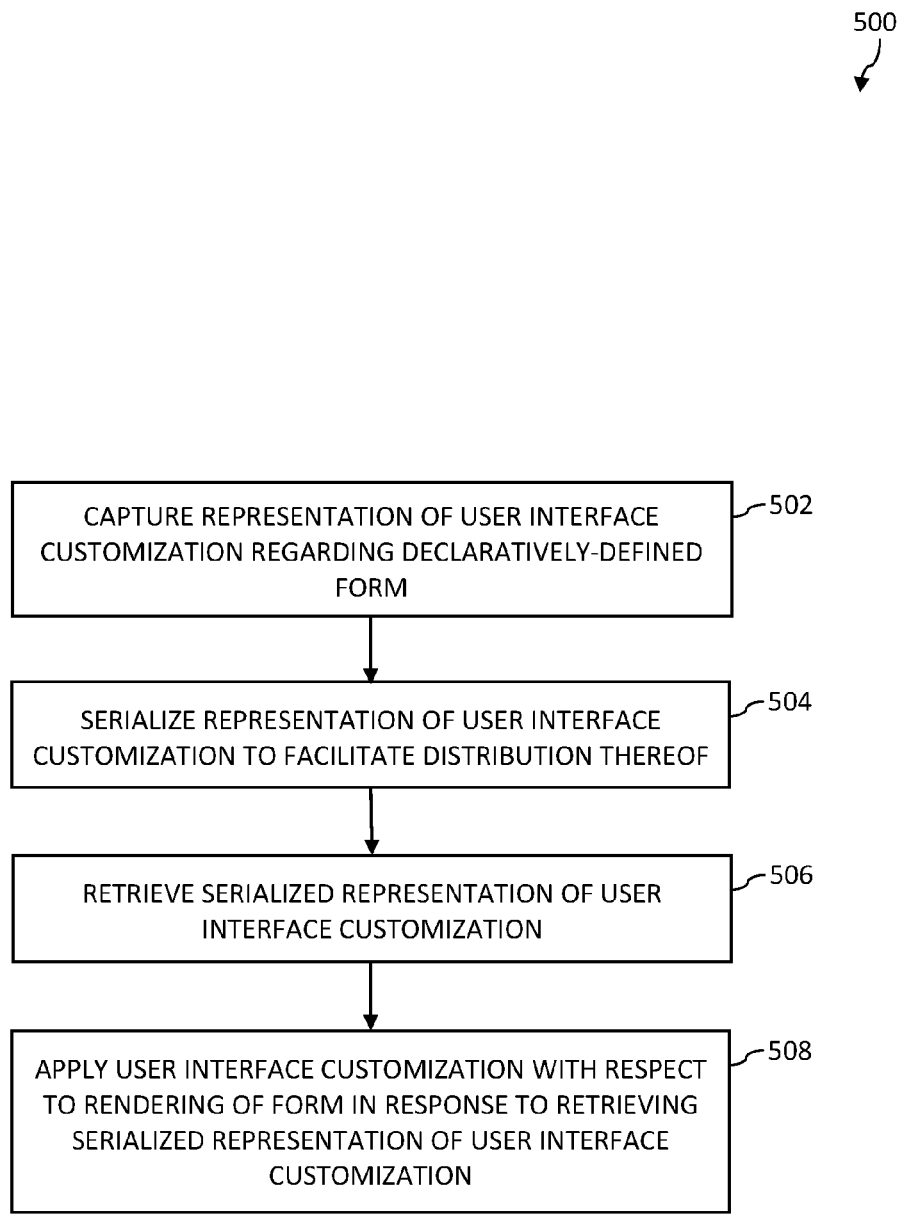

FIG. 5 depicts a flowchart 500 of a method for customizing a form in a model-based system in accordance with an embodiment. Flowchart 500 is described from the perspective of a manager. Flowchart 500 may be performed by manager 104 of computer network 100 shown in FIG. 1, for example. For illustrative purposes, flowchart 500 is described with respect to a manager 104" shown in FIG. 6, which is an example of manager 104, according to an embodiment.

Figure 6:
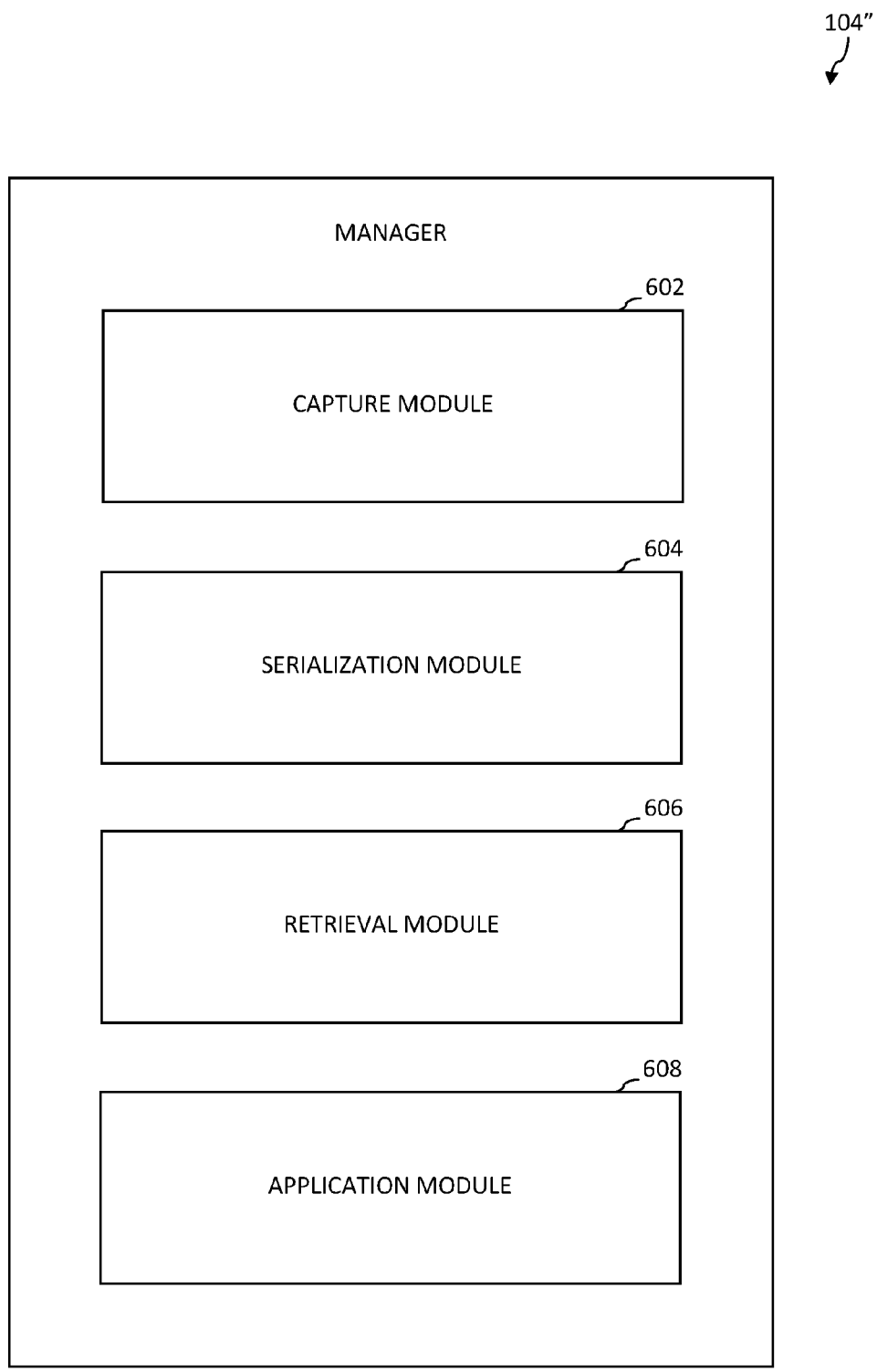

As shown in FIG. 6, manager 104" includes a capture module 602, a serialization module 604, a retrieval module 606, and an application module 608. Further structural and operational embodiments will be apparent to persons skilled in the relevant art(s) based on the discussion regarding flowchart 500. Flowchart 500 is described as follows.

As shown in FIG. 5, the method of flowchart 500 begins at step 502. In step 502, a representation of a user interface customization regarding a declaratively-defined form is captured. A declaratively-defined form is a form that is defined using a declarative programming language, as opposed to an imperative programming language. For instance, the behavior of the form may be defined by setting properties of controls on the form, rather than by applying methods and handling events of the controls. The representation of the user interface customization may be captured in memory, such as random access memory (RAM), though the scope of the embodiments is not limited in this respect. In an example implementation, capture module 602 captures the representation of the user interface customization.

At step 504, the representation of the user interface customization is serialized to facilitate distribution thereof. In a first example, the representation of the user interface customization is serialized to a file. In a second example, the representation of the user interface customization is serialized to a database. In accordance with this example, the representation of the user interface customization may be exported to a file. In an example implementation, serialization module 604 serializes the representation of the user interface customization.

At step 506, the serialized representation of the user interface customization is retrieved. For instance, the serialized representation of the user interface customization may be retrieved from a file or a database. In an example implementation, retrieval module 606 retrieves the serialized representation of the user interface customization.

At step 508, the user interface customization is applied with respect to a rendering of the form in response to retrieving the serialized representation of the user interface customization. For instance, the user interface customization may be applied to declaratively-defined aspects of the form with respect to the rendering and/or to non-defined aspects of the form with respect to the rendering. In an example implementation, application module 608 applies the user interface customization with respect to the rendering of the form.

Figure 7:
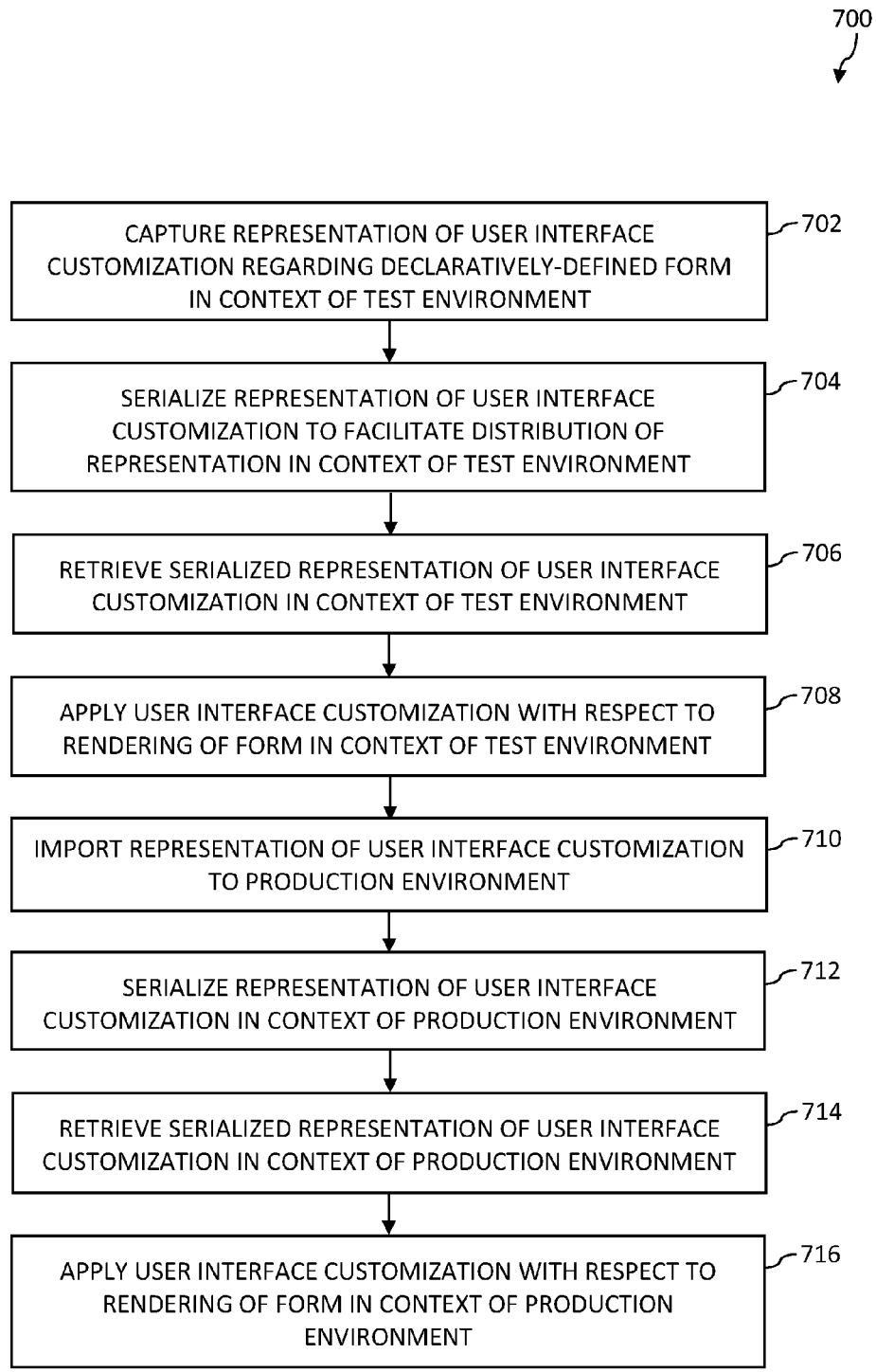

FIG. 7 depicts a flowchart 700 of a method for customizing a form in a model-based system in accordance with an embodiment. Flowchart 700 is described from the perspective of a manager. Flowchart 700 may be performed by manager 104 of computer network 100 shown in FIG. 1, for example. For illustrative purposes, flowchart 700 is described with respect to a manager 104''' shown in FIG. 8, which is an example of manager 104, according to an embodiment.

Figure 8:
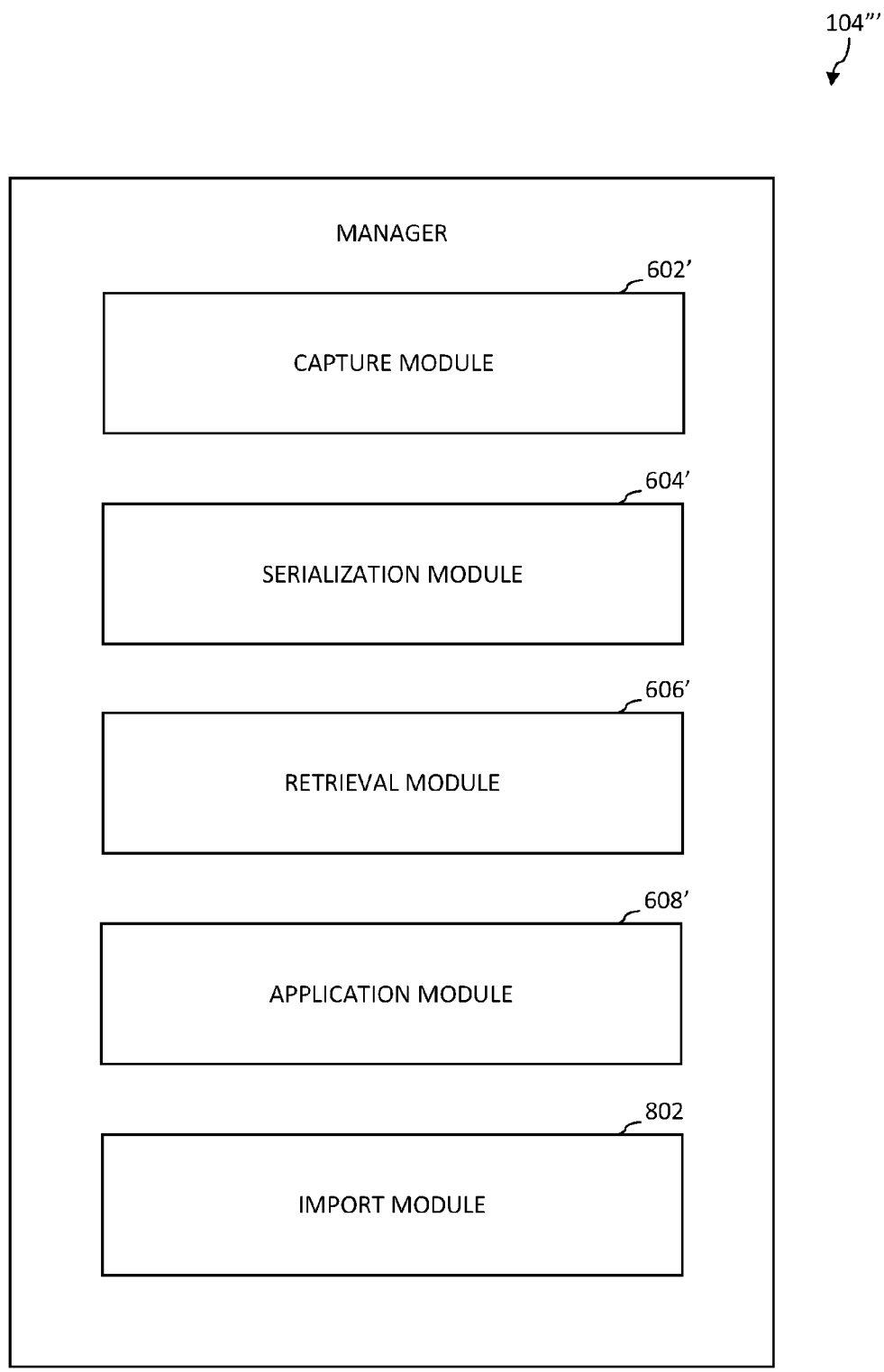

As shown in FIG. 8, manager 104''' includes a capture module 602', a serialization module 604', a retrieval module 606', and an application module 608'. Further structural and operational embodiments will be apparent to persons skilled in the relevant art(s) based on the discussion regarding flowchart 700. Flowchart 700 is described as follows.

As shown in FIG. 7, the method of flowchart 700 begins at step 702. In step 702, a representation of a user interface customization regarding a declaratively-defined form is captured in a context of a test environment. In an example implementation, capture module 602' captures the representation of the user interface customization in the context of the test environment.

At step 704, the representation of the user interface customization is serialized to facilitate distribution of the representation in the context of the test environment. In an example implementation, serialization module 604' serializes the representation of the user interface customization in the context of the test environment.

At step 706, the serialized representation of the user interface customization is retrieved in the context of the test environment. In an example implementation, retrieval module 606' retrieves the serialized representation of the user interface customization in the context of the test environment.

At step 708, the user interface customization is applied with respect to a rendering of the form in response to retrieving the serialized representation of the user interface customization. In an example implementation, application module 608' applies the user interface customization with respect to the rendering of the form in the context of the test environment.

At step 710, the representation of the user interface customization is imported to a production environment. In an example implementation, import module 802 imports the representation of the user interface customization to the production environment.

At step 712, the representation of the user interface customization is serialized in the context of the production environment. In an example implementation, serialization module 604' serializes the representation of the user interface customization in the context of the production environment.

At step 714, the serialized representation of the user interface customization is retrieved in the context of the production environment. In an example implementation, retrieval module 606' retrieves the serialized representation of the user interface customization in the context of the production environment.

At step 716, the user interface customization is applied with respect to a rendering of the form in the context of the production environment. In an example implementation, application module 608' applies the user interface customization with respect to the rendering of the form in the context of the production environment.

Figure 9:
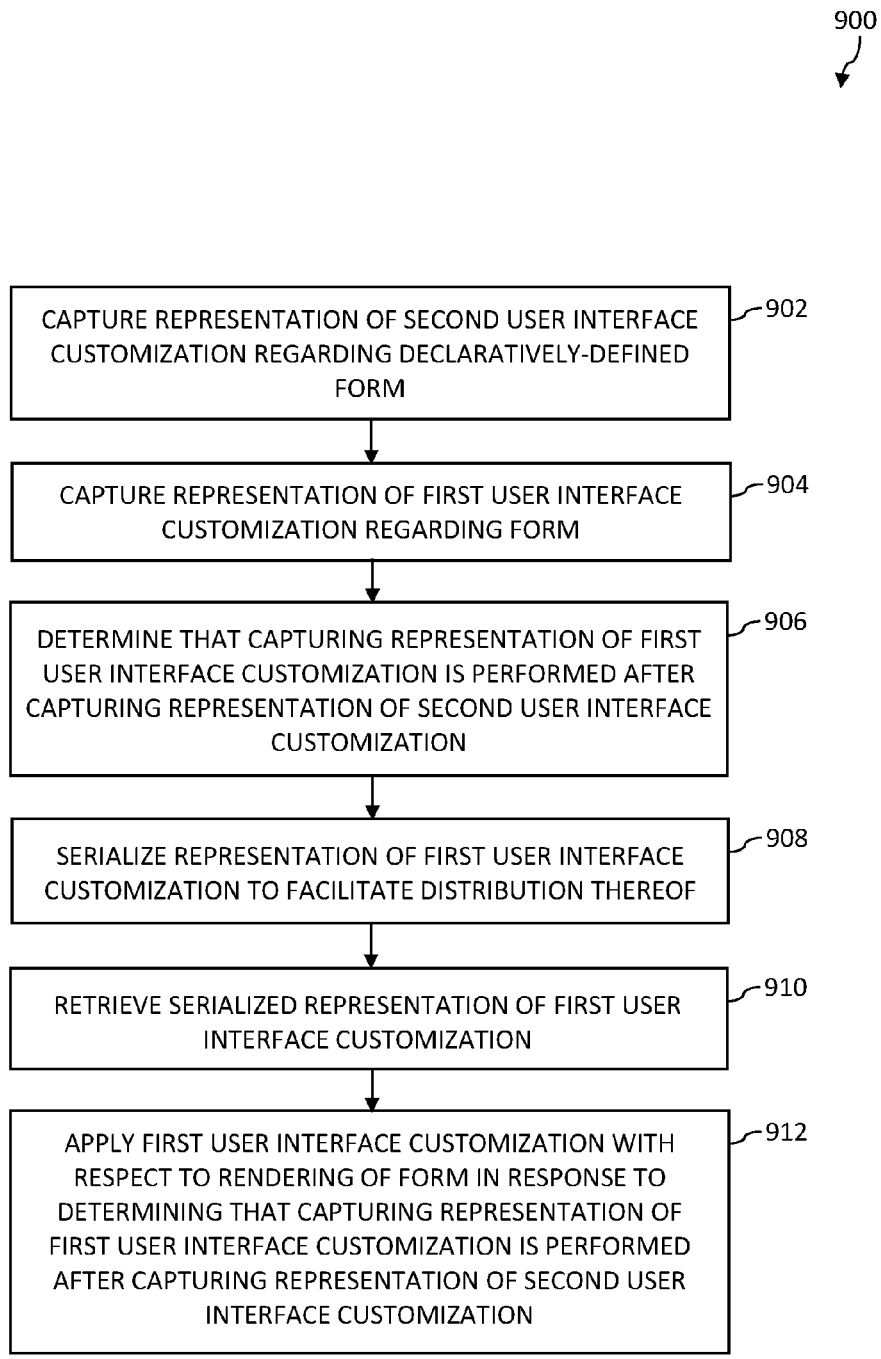

FIG. 9 depicts a flowchart 900 of a method for customizing a form in a model-based system in accordance with an embodiment. Flowchart 900 is described from the perspective of a manager. Flowchart 900 may be performed by manager 104 of computer network 100 shown in FIG. 1, for example. For illustrative purposes, flowchart 900 is described with respect to a manager 104'''' shown in FIG. 10, which is an example of manager 104, according to an embodiment.

Figure 10:
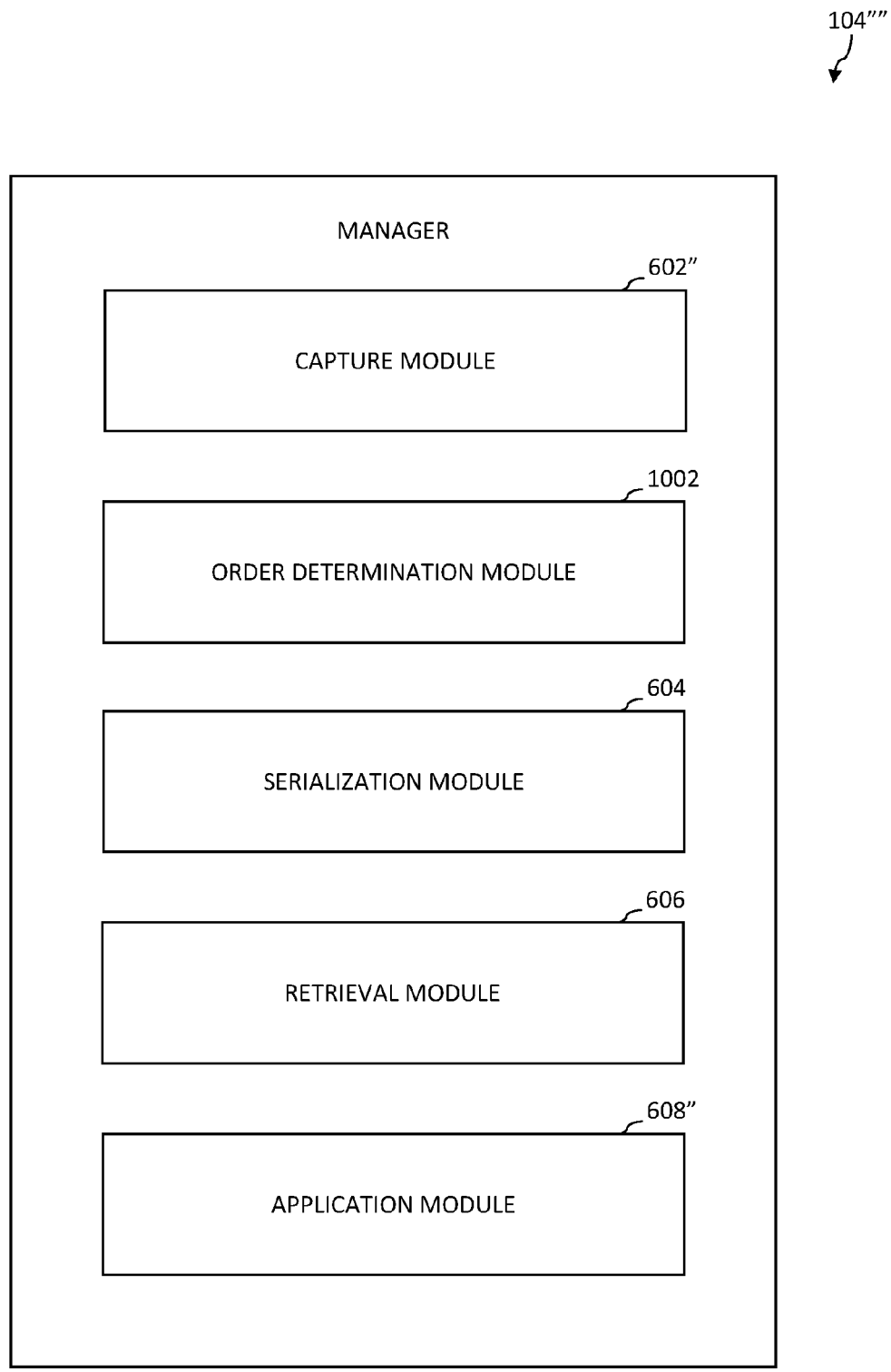

As shown in FIG. 10, manager 104'''' includes a capture module 602'', an order determination module 1002, a serialization module 604, a retrieval module 606, and an application module 608''. Further structural and operational embodiments will be apparent to persons skilled in the relevant art(s) based on the discussion regarding flowchart 900. Flowchart 900 is described as follows.

As shown in FIG. 9, the method of flowchart 900 begins at step 902. In step 902, a representation of a second user interface customization regarding a declaratively-defined form is captured. In an example implementation, capture module 602'' captures the representation of the second user interface customization.

At 904, a representation of a first user interface customization regarding a form is captured. In an example implementation, capture module 602'' captures the representation of the first user interface customization.

At step 906, a determination is made that capturing the representation of the first user interface customization is performed after capturing the representation of the second user interface customization. In an example implementation, order determination module 1002 determines that capturing the representation of the first user interface customization is performed after capturing the representation of the second user interface customization.

At step 908, the representation of the first user interface customization is serialized to facilitate distribution thereof. In an example implementation, serialization module 604 serializes the representation of the first user interface customization.

At step 910, the serialized representation of the first user interface customization is retrieved. In an example implementation, retrieval module 606 retrieves the serialized representation of the first user interface customization.

At step 912, the first user interface customization is applied with respect to a rendering of the form in response to determining that capturing the representation of the first user interface customization is performed after capturing the representation of the second user interface customization. In an example implementation, application module 608″ applies the first user interface customization with respect to the rendering of the form.

Figure 11:
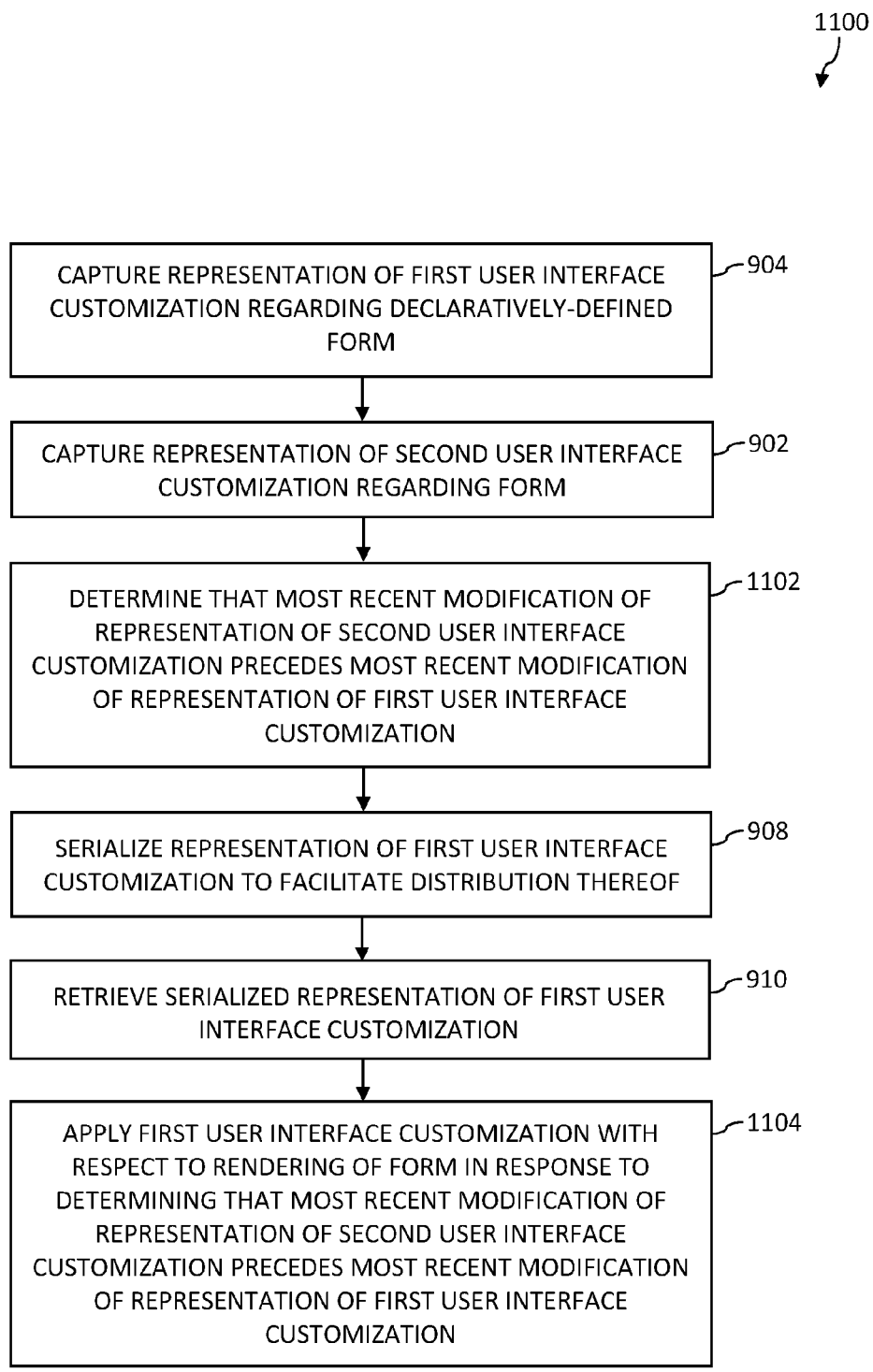

FIG. 11 depicts a flowchart 1100 of a method for customizing a form in a model-based system in accordance with an embodiment. Flowchart 1100 is described from the perspective of a manager. Flowchart 1100 may be performed by manager 104 of computer network 100 shown in FIG. 1, for example. For illustrative purposes, flowchart 1100 is described with respect to a manager 104‴ shown in FIG. 12, which is an example of manager 104, according to an embodiment.

Figure 12:
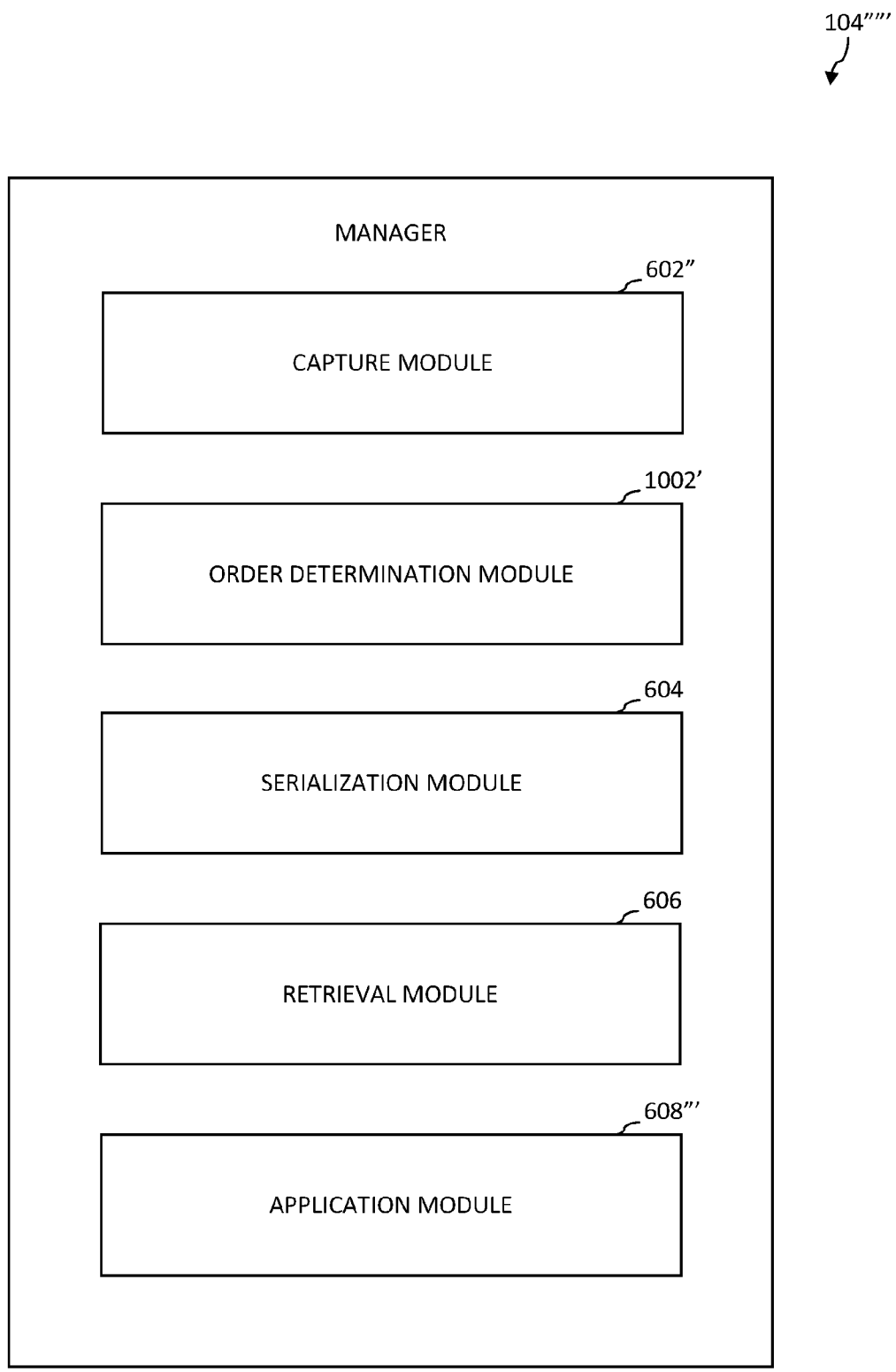

As shown in FIG. 12, manager 104″ includes a capture module 602″, an order determination module 1002′, a serialization module 604, a retrieval module 606, and an application module 608‴. Further structural and operational embodiments will be apparent to persons skilled in the relevant art(s) based on the discussion regarding flowchart 1100. Flowchart 1100 is described as follows.

As shown in FIG. 11, the method of flowchart 1100 begins at step 904. In step 904, a representation of a first user interface customization regarding a declaratively-defined form is captured. In an example implementation, capture module 602″ captures the representation of the first user interface customization.

At 902, a representation of a second user interface customization regarding a form is captured. In an example implementation, capture module 602″ captures the representation of the second user interface customization.

At step 1102, a determination is made that a most recent modification of the representation of the second user interface customization precedes a most recent modification of the representation of the first user interface customization. In an example implementation, order determination module 1002′ determines that the most recent modification of the representation of the second user interface customization precedes the most recent modification of the representation of the first user interface customization.

At step 908, the representation of the first user interface customization is serialized to facilitate distribution thereof. In an example implementation, serialization module 604 serializes the representation of the first user interface customization.

At step 910, the serialized representation of the first user interface customization is retrieved. In an example implementation, retrieval module 606 retrieves the serialized representation of the first user interface customization.

At step 1104, the first user interface customization is applied with respect to a rendering of the form in response to determining that the most recent modification of the representation of the second user interface customization precedes the most recent modification of the representation of the first user interface customization. In an example implementation, application module 608‴ applies the first user interface customization with respect to the rendering of the form.

Figure 13:
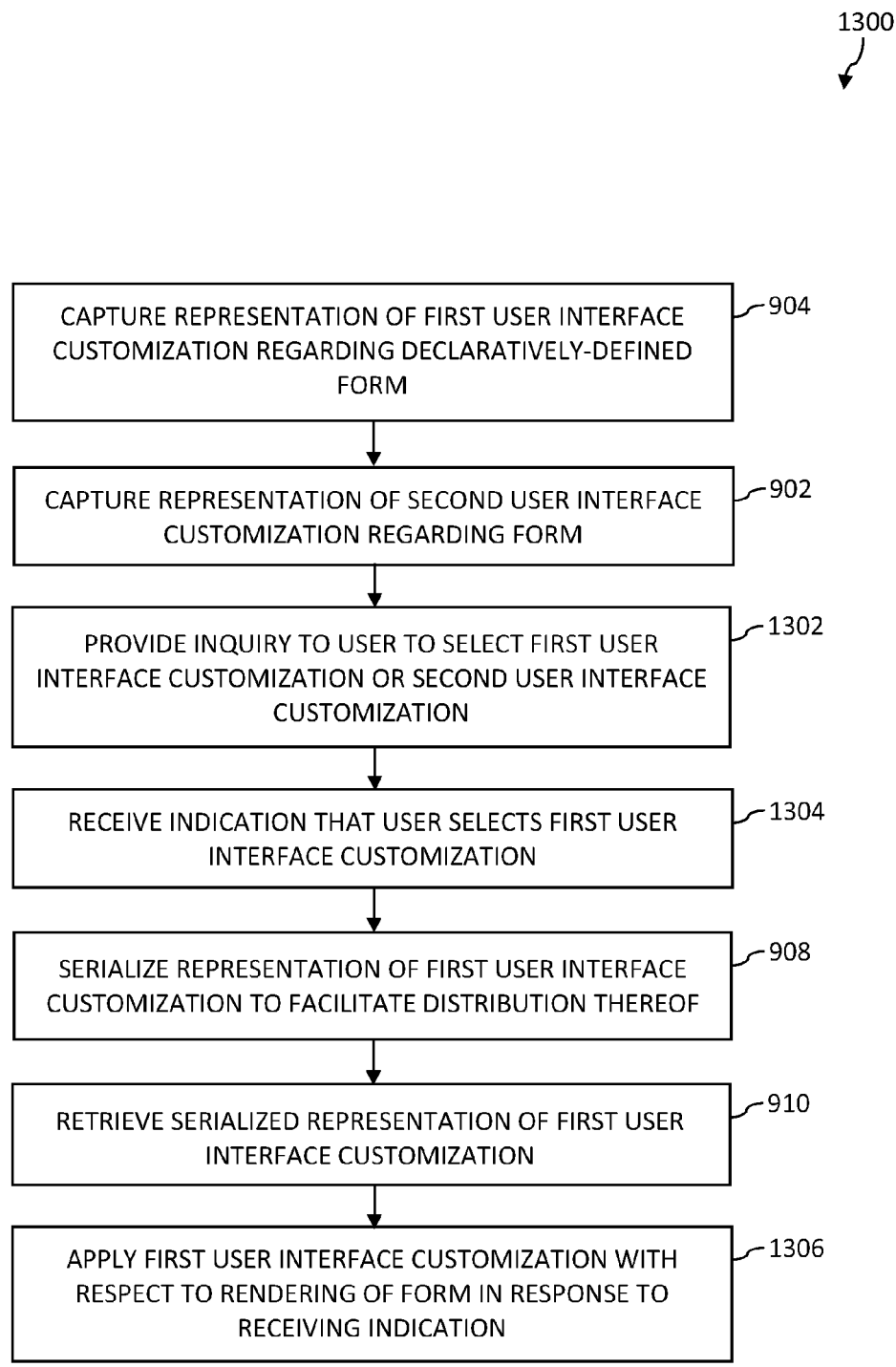

FIG. 13 depicts a flowchart 1300 of a method for customizing a form in a model-based system in accordance with an embodiment. Flowchart 1300 is described from the perspective of a manager. Flowchart 1300 may be performed by manager 104 of computer network 100 shown in FIG. 1, for example. For illustrative purposes, flowchart 1300 is described with respect to a manager 104⁗ shown in FIG. 14, which is an example of manager 104, according to an embodiment.

Figure 14:
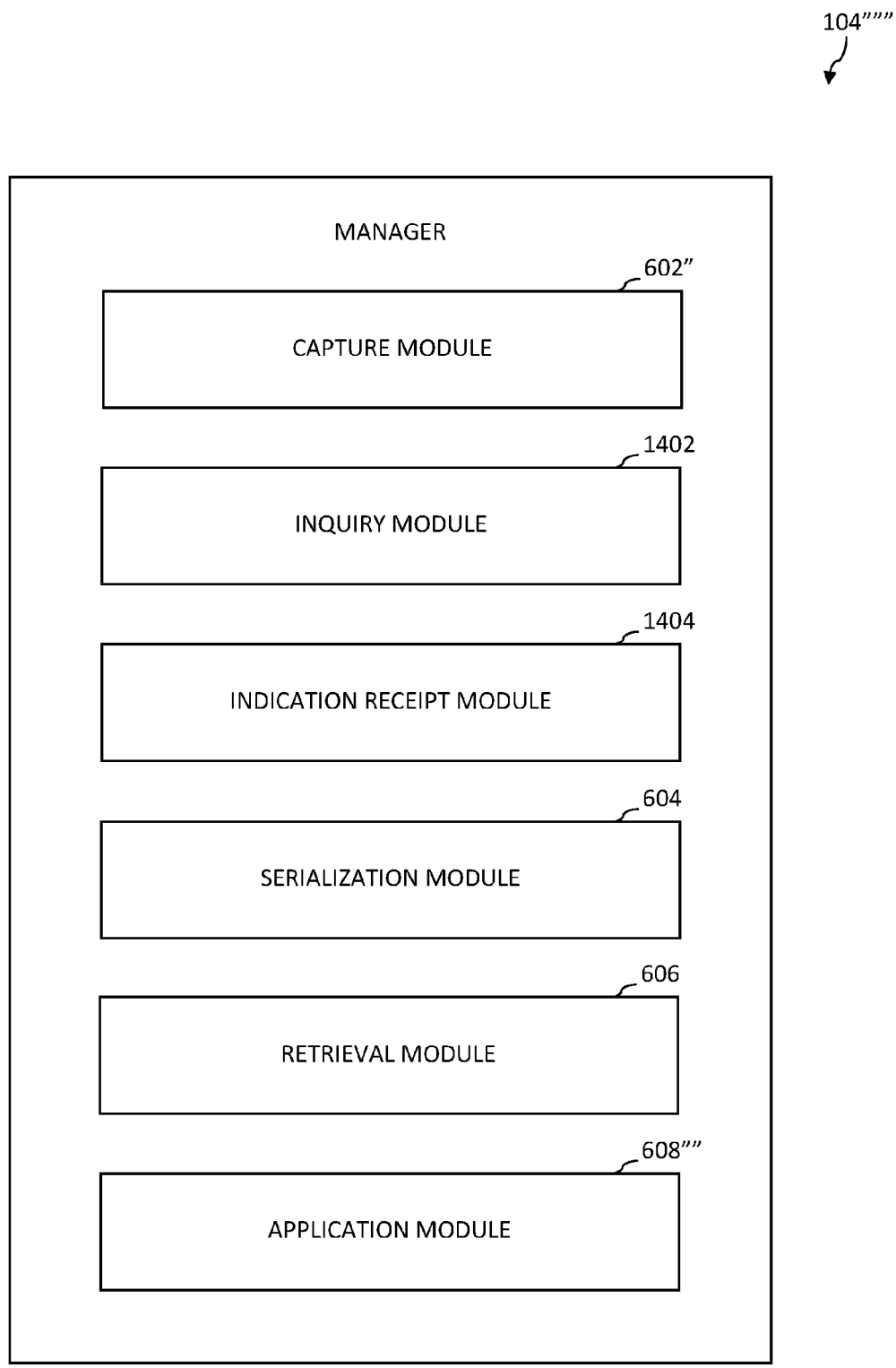

As shown in FIG. 14, manager 104″ includes a capture module 602″, an inquiry module 1402, an indication receipt module 1404, a serialization module 604, a retrieval module 606, and an application module 608⁗. Further structural and operational embodiments will be apparent to persons skilled in the relevant art(s) based on the discussion regarding flowchart 1300. Flowchart 1300 is described as follows.

As shown in FIG. 13, the method of flowchart 1300 begins at step 904. In step 904, a representation of a first user interface customization regarding a declaratively-defined form is captured. In an example implementation, capture module 602″ captures the representation of the first user interface customization.

At 902, a representation of a second user interface customization regarding a form is captured. In an example implementation, capture module 602″ captures the representation of the second user interface customization.

At step 1302, an inquiry is provided to a user to select the first user interface customization or the second user interface customization. For instance, the inquiry may be provided via a user interface that is available to the user. In an example implementation, inquiry module 1402 provides the inquiry to the user.

At step 1304, an indication is received that the user selects the first user interface customization. In an example implementation, indication receipt module 1404 receives the indication that the user selects the first user interface customization.

At step 908, the representation of the first user interface customization is serialized to facilitate distribution thereof. In an example implementation, serialization module 604 serializes the representation of the first user interface customization.

At step 910, the serialized representation of the first user interface customization is retrieved. In an example implementation, retrieval module 606 retrieves the serialized representation of the first user interface customization.

At step 1306, the first user interface customization is applied with respect to a rendering of the form in response to receiving the indication. In an example implementation, application module 608⁗ applies the first user interface customization with respect to the rendering of the form.

Figure 15:
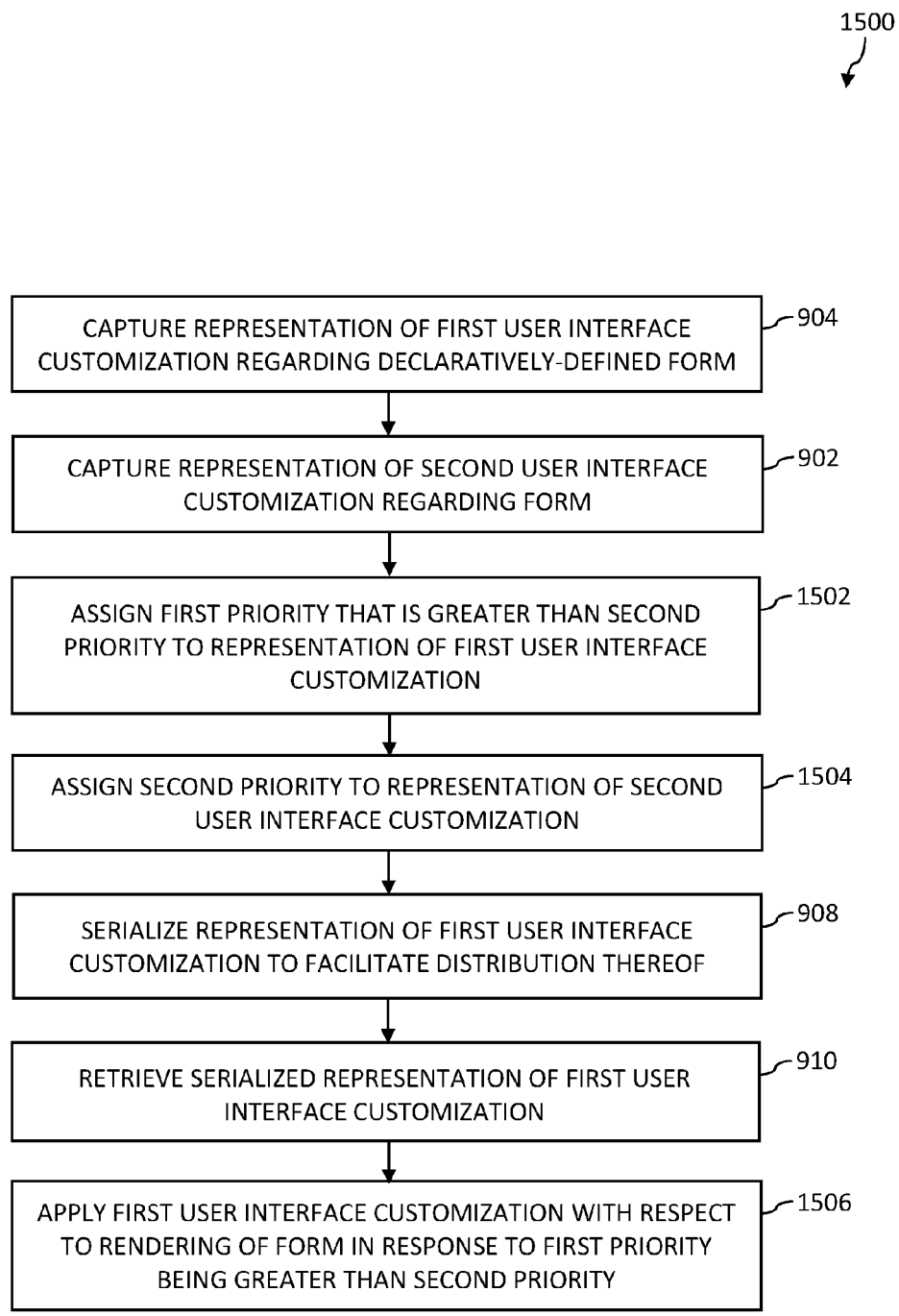

FIG. 15 depicts a flowchart 1500 of a method for customizing a form in a model-based system in accordance with an embodiment. Flowchart 1500 is described from the perspective of a manager. Flowchart 1500 may be performed by manager 104 of computer network 100 shown in FIG. 1, for example. For illustrative purposes, flowchart 1500 is described with respect to a manager 104″″′ shown in FIG. 16, which is an example of manager 104, according to an embodiment.

Figure 16:
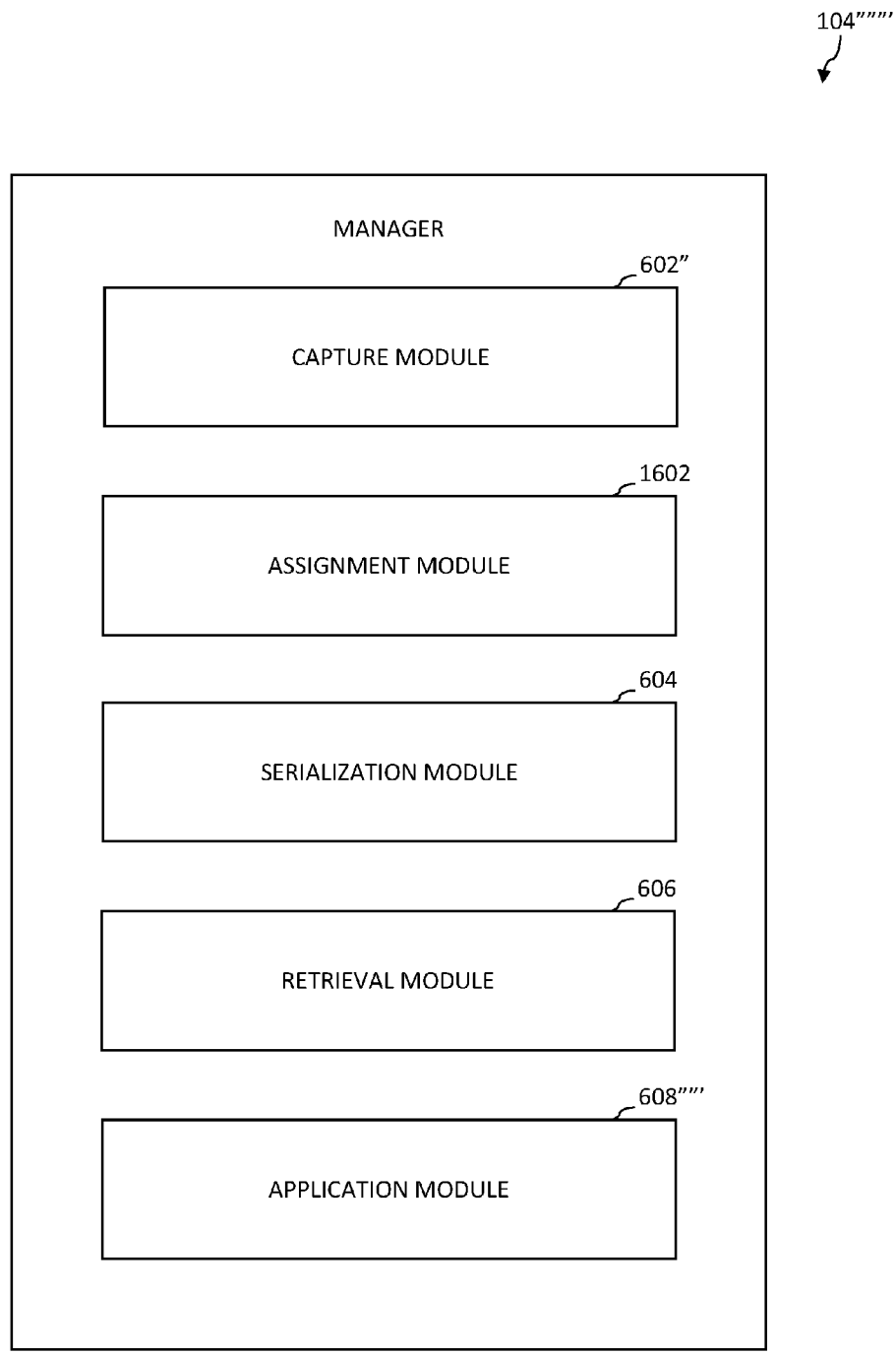

As shown in FIG. 16, manager 104″ includes a capture module 602″, an assignment module 1602, a serialization module 604, a retrieval module 606, and an application module 608″″′. Further structural and operational embodiments will be apparent to persons skilled in the relevant art(s) based on the discussion regarding flowchart 1500. Flowchart 1500 is described as follows.

As shown in FIG. 15, the method of flowchart 1500 begins at step 904. In step 904, a representation of a first user interface customization regarding a declaratively-defined form is captured. In an example implementation, capture module 602" captures the representation of the first user interface customization.

At 902, a representation of a second user interface customization regarding a form is captured. In an example implementation, capture module 602" captures the representation of the second user interface customization.

At step 1502, a first priority that is greater than a second priority is assigned to the representation of the first user interface customization. In an example implementation, assignment module 1602 assigns the first priority to the representation of the first user interface customization.

At step 1504, the second priority is assigned to the representation of the second user interface customization. In an example implementation, assignment module 1602 assigns the second priority to the representation of the second user interface customization.

At step 908, the representation of the first user interface customization is serialized to facilitate distribution thereof. In an example implementation, serialization module 604 serializes the representation of the first user interface customization.

At step 910, the serialized representation of the first user interface customization is retrieved. In an example implementation, retrieval module 606 retrieves the serialized representation of the first user interface customization.

At step 1506, the first user interface customization is applied with respect to a rendering of the form in response to the first priority being greater than the second priority. In an example implementation, application module 608"" applies the first user interface customization with respect to the rendering of the form.

Figure 17:
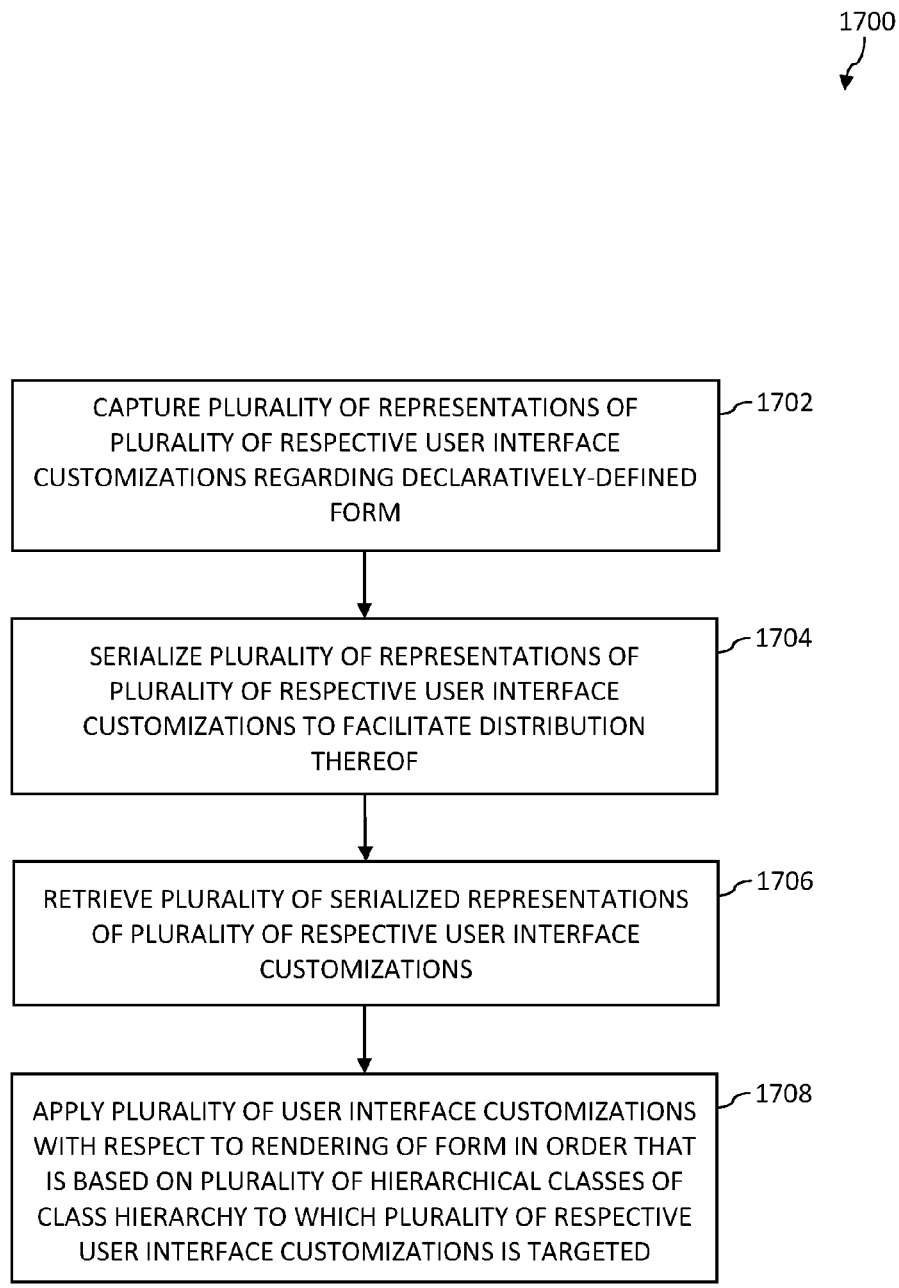

FIG. 17 depicts a flowchart 1700 of a method for customizing a form in a model-based system in accordance with an embodiment. Flowchart 1700 is described from the perspective of a manager. Flowchart 1700 may be performed by manager 104 of computer network 100 shown in FIG. 1, for example. For illustrative purposes, flowchart 1700 is described with respect to a manager 104"""" shown in FIG. 18, which is an example of manager 104, according to an embodiment.

Figure 18:
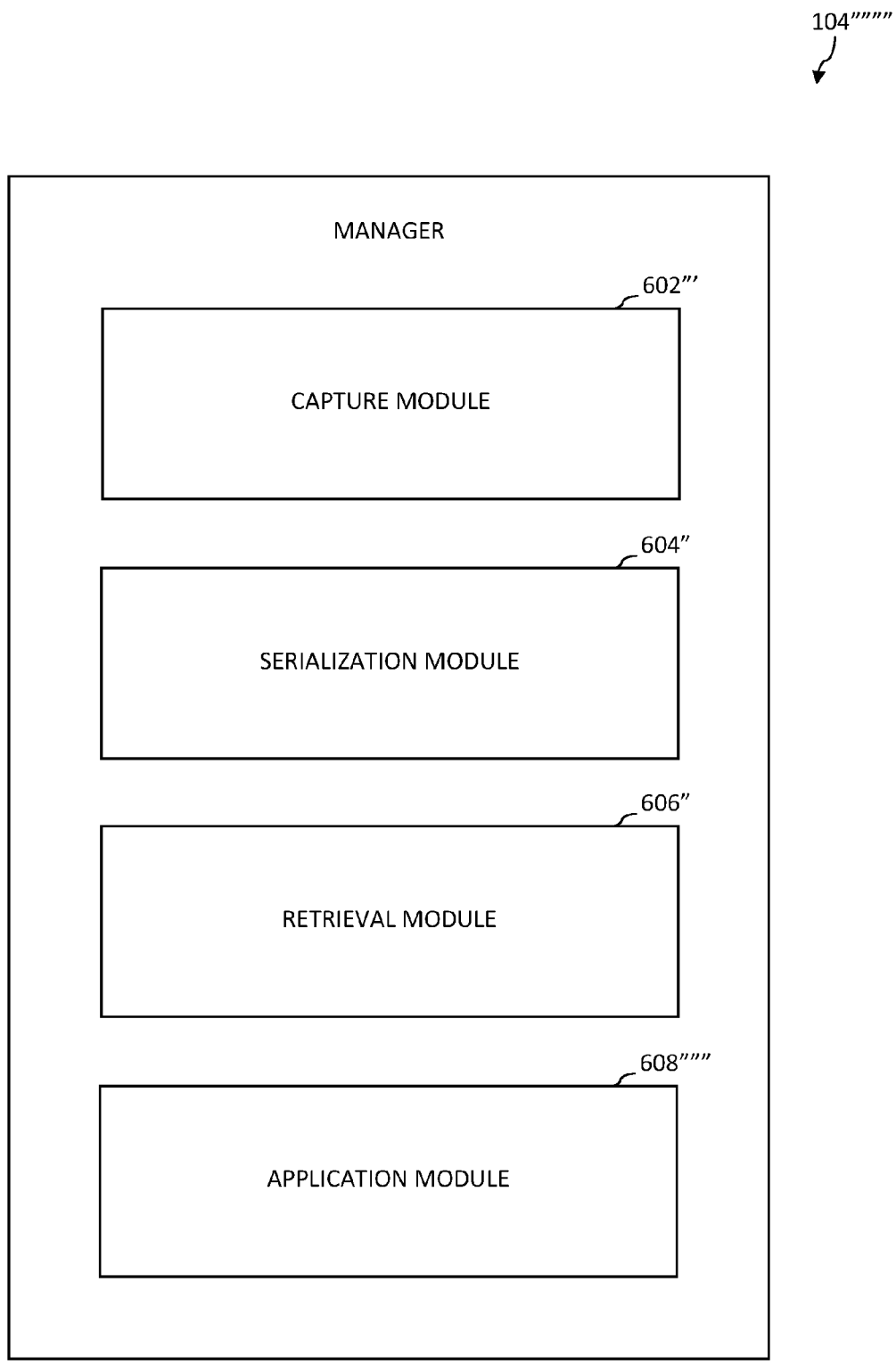

As shown in FIG. 18, manager 104" includes a capture module 602'", a serialization module 604", a retrieval module 606", and an application module 608"". Further structural and operational embodiments will be apparent to persons skilled in the relevant art(s) based on the discussion regarding flowchart 1700. Flowchart 1700 is described as follows.

As shown in FIG. 17, the method of flowchart 1700 begins at step 1702. In step 1702, a plurality of representations of a plurality of respective user interface customizations regarding a declaratively-defined form is captured. In an example implementation, capture module 602'" captures the plurality of representations of the plurality of respective user interface customizations.

At step 1704, the plurality of representations of the plurality of respective user interface customizations is serialized to facilitate distribution thereof. In an example implementation, serialization module 604" serializes the plurality of representations of the plurality of respective user interface customizations.

At step 1706, the plurality of serialized representations of the plurality of respective user interface customizations is retrieved. In an example implementation, retrieval module 606" retrieves the plurality of serialized representations of the plurality of respective user interface customizations.

At step 1708, the plurality of user interface customizations is applied with respect to a rendering of the form in an order that is based on a plurality of hierarchical classes of a class hierarchy to which the plurality of respective user interface customizations is targeted. In an example implementation, application module 608"" applies the plurality of user interface customizations with respect to the rendering of the form.

For example, a data model may include a plurality of classes, such that each class corresponds to a respective level of a class hierarchy. In accordance with this example, the first (i.e. root) level of the hierarchy may include a generic class called "entity". A second level of the hierarchy may include a "work item" class that is derived from the "entity" class. A third level of the hierarchy may include an "incident" class that is derived from the "work item" class, and so on. The first level is referred to as being the highest level in the hierarchy, and the other levels are referred to as consecutively lower levels in the hierarchy.

The properties that are associated with the form may be defined based on the classes in the hierarchy. Properties that are at a designated level of the hierarchy are inherited to classes in consecutively lower levels of the hierarchy with respect to the designated level. For instance, if a property is at the second level of the hierarchy, that property is inherited to classes in the third level, then to classes in the fourth level, and so on. It should be noted that relationship types that are at a designated level of the hierarchy may be inherited to classes in consecutively lower levels of the hierarchy with respect to the designated level. Accordingly, the plurality of user interface customizations may be targeted at the various levels of the class hierarchy.

Figure 19:
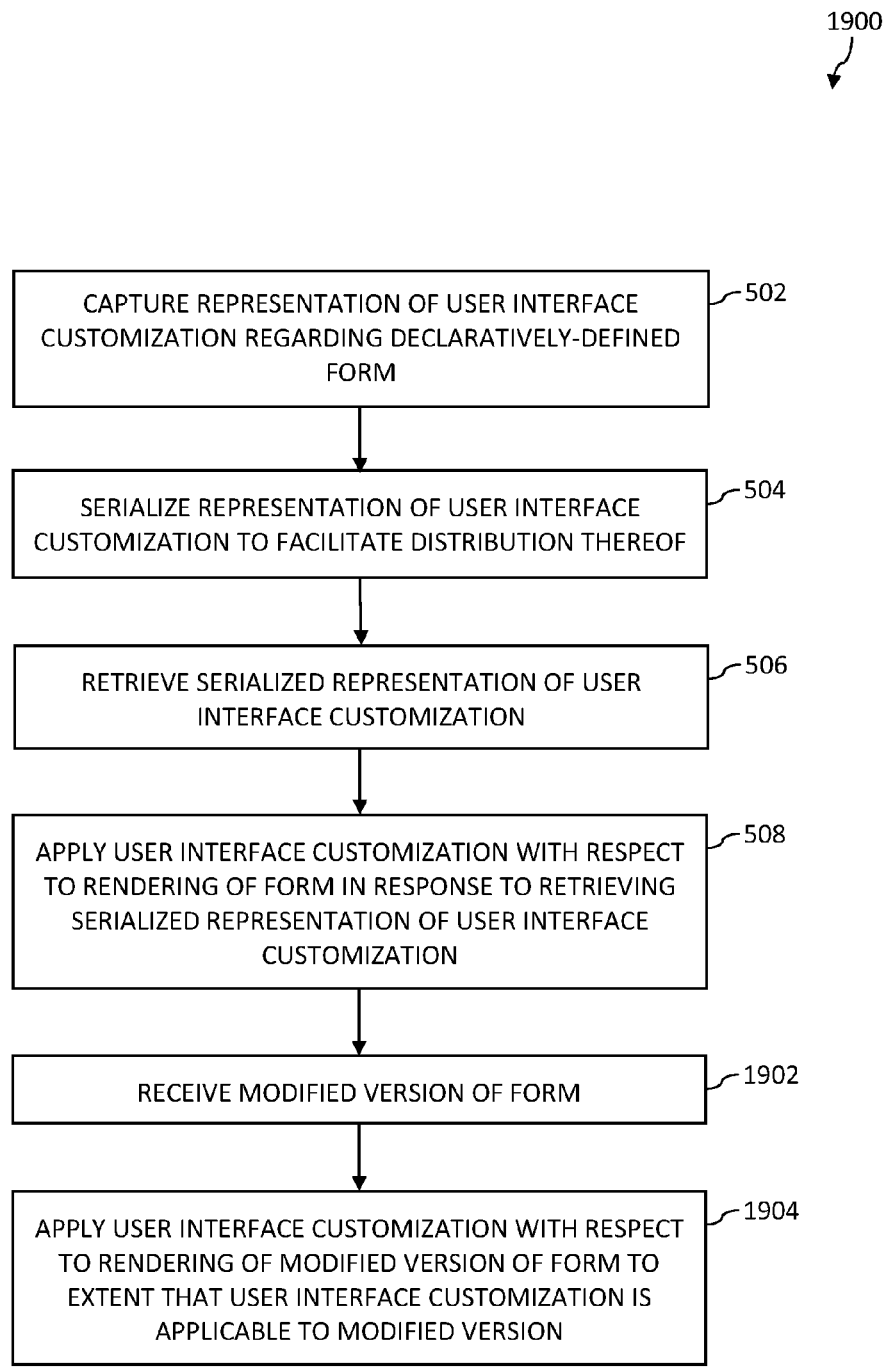

FIG. 19 depicts a flowchart 1900 of a method for customizing a form in a model-based system in accordance with an embodiment. Flowchart 1900 is described from the perspective of a manager. Flowchart 1900 may be performed by manager 104 of computer network 100 shown in FIG. 1, for example. For illustrative purposes, flowchart 1900 is described with respect to a manager 104"""" shown in FIG. 20, which is an example of manager 104, according to an embodiment.

Figure 20:
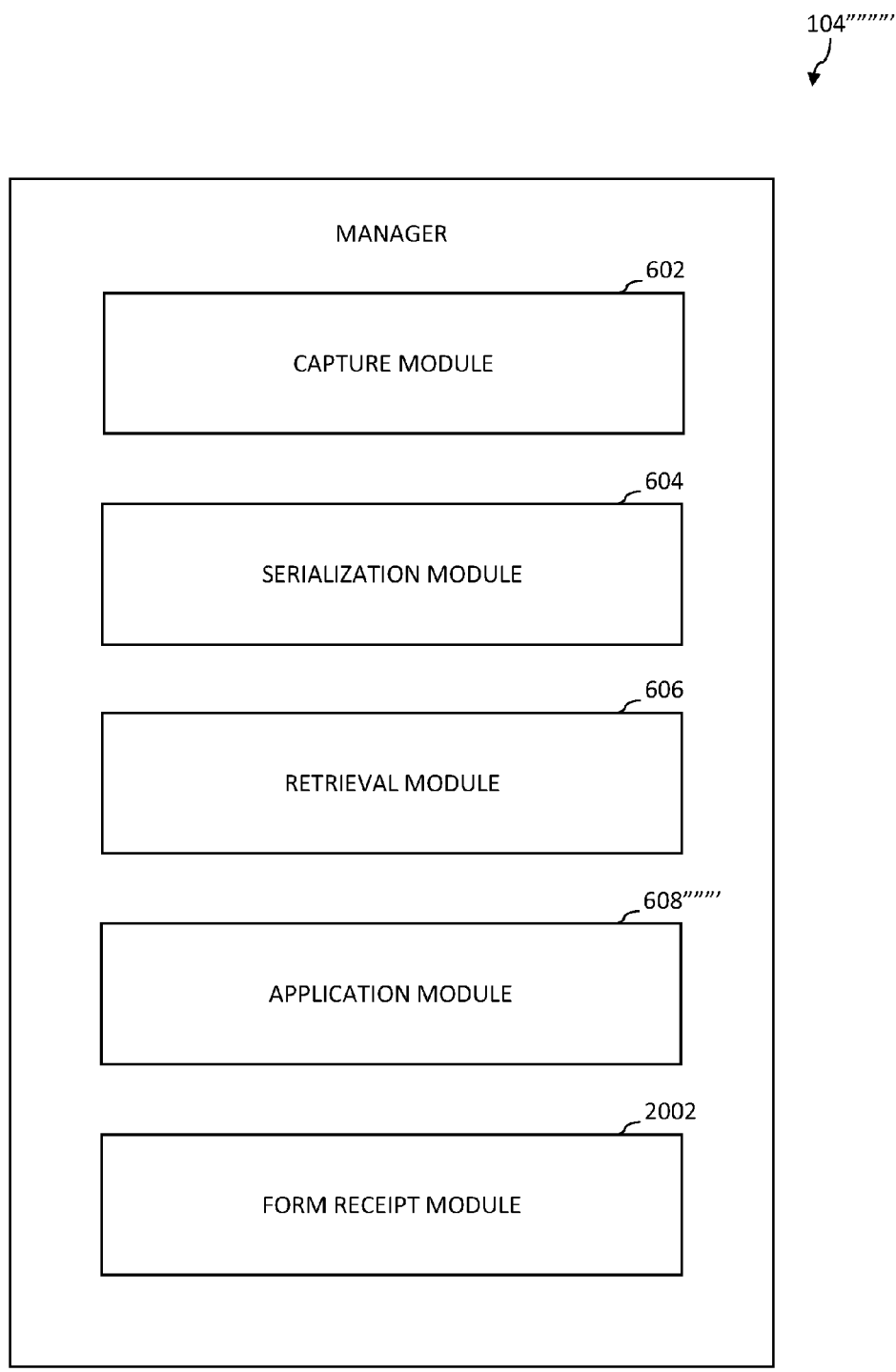

As shown in FIG. 20, manager 104"""" includes a capture module 602, a serialization module 604, a retrieval module 606, an application module 608"", and a form receipt module 2002. Further structural and operational embodiments will be apparent to persons skilled in the relevant art(s) based on the discussion regarding flowchart 1900. Flowchart 1900 is described as follows.

As shown in FIG. 19, the method of flowchart 1900 begins at step 502. In step 502, a representation of a user interface customization regarding a declaratively-defined form is captured. In an example implementation, capture module 602 captures the representation of the user interface customization.

At step 504, the representation of the user interface customization is serialized to facilitate distribution thereof. In an example implementation, serialization module 604 serializes the representation of the user interface customization.

At step 506, the serialized representation of the user interface customization is retrieved. In an example implementation, retrieval module 606 retrieves the serialized representation of the user interface customization.

At step 508, the user interface customization is applied with respect to a rendering of the form in response to retrieving the serialized representation of the user interface customization. In an example implementation, application module 608'''''' applies the user interface customization with respect to the rendering of the form.

At step 1902, a modified version of the form is received. In an example implementation, form receipt module 2002 receives the modified version of the form.

At step 1904, the user interface customization is applied with respect to a rendering of the modified version of the form to an extent that the user interface customization is applicable to the modified version. For example, assume for purposes of illustration that the original version of the form has a textbox at first position X=20, Y=20, and a user moves the textbox to a second position X=40, Y=60 using a form customization tool. Further assume that the modified version of the form is released, which has the textbox at position X=80, Y=80. In accordance with this example, the customization is applied to the modified version of the form, such that the textbox is displayed at position X=40, Y=60 when the modified version of the form is displayed to the user. When a form customization is no longer applicable, for example, because a control that had customizations defined for it does not exist in the modified version of the form, the form customization is ignored. In an example implementation, application module 608'''''' applies the user interface customization with respect to the rendering of the modified version of the form.

Figure 21:
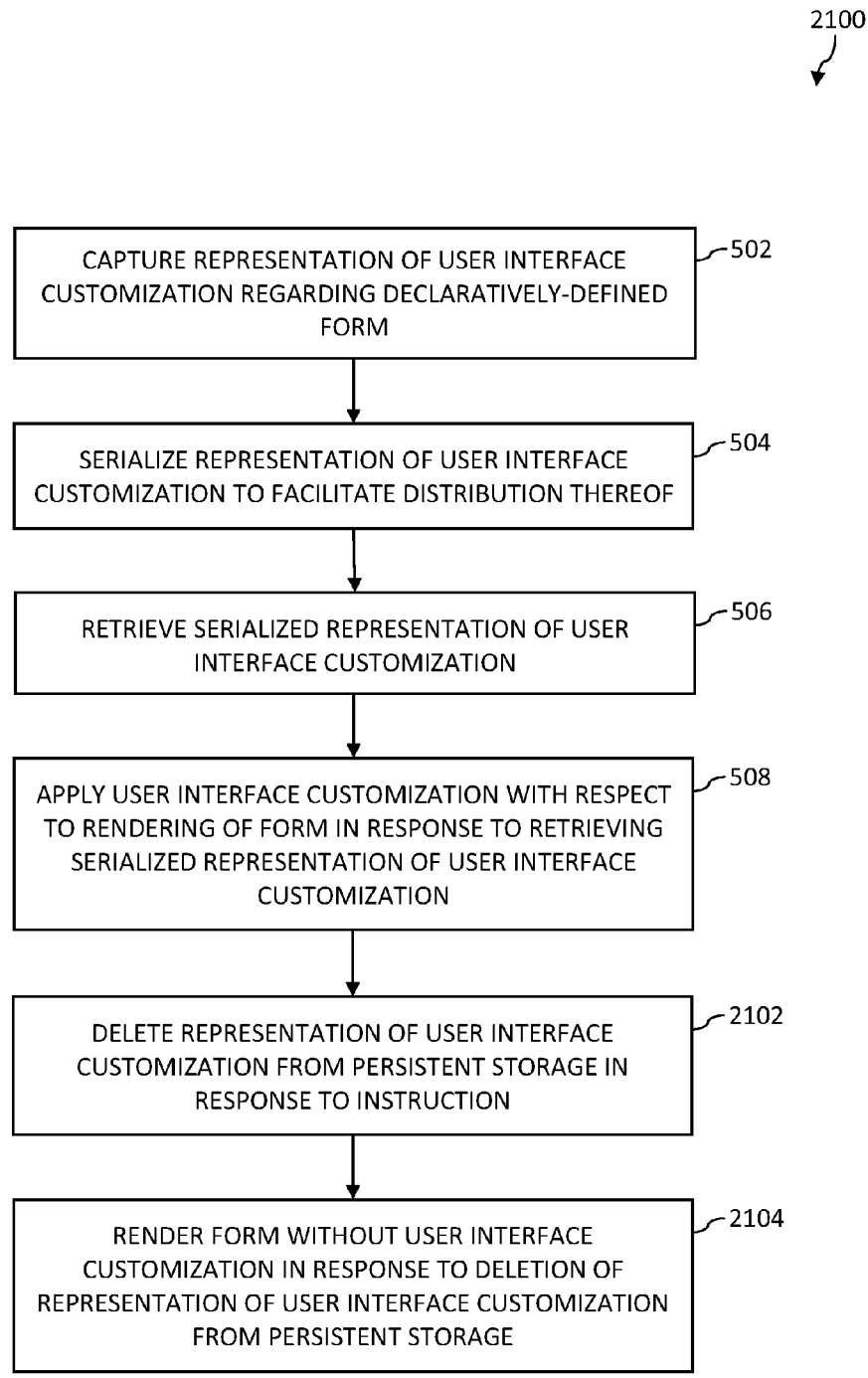

FIG. 21 depicts a flowchart 2100 of a method for customizing a form in a model-based system in accordance with an embodiment. Flowchart 2100 is described from the perspective of a manager. Flowchart 2100 may be performed by manager 104 of computer network 100 shown in FIG. 1, for example. For illustrative purposes, flowchart 2100 is described with respect to a manager 104'''''''' shown in FIG. 22, which is an example of manager 104, according to an embodiment.

Figure 22:
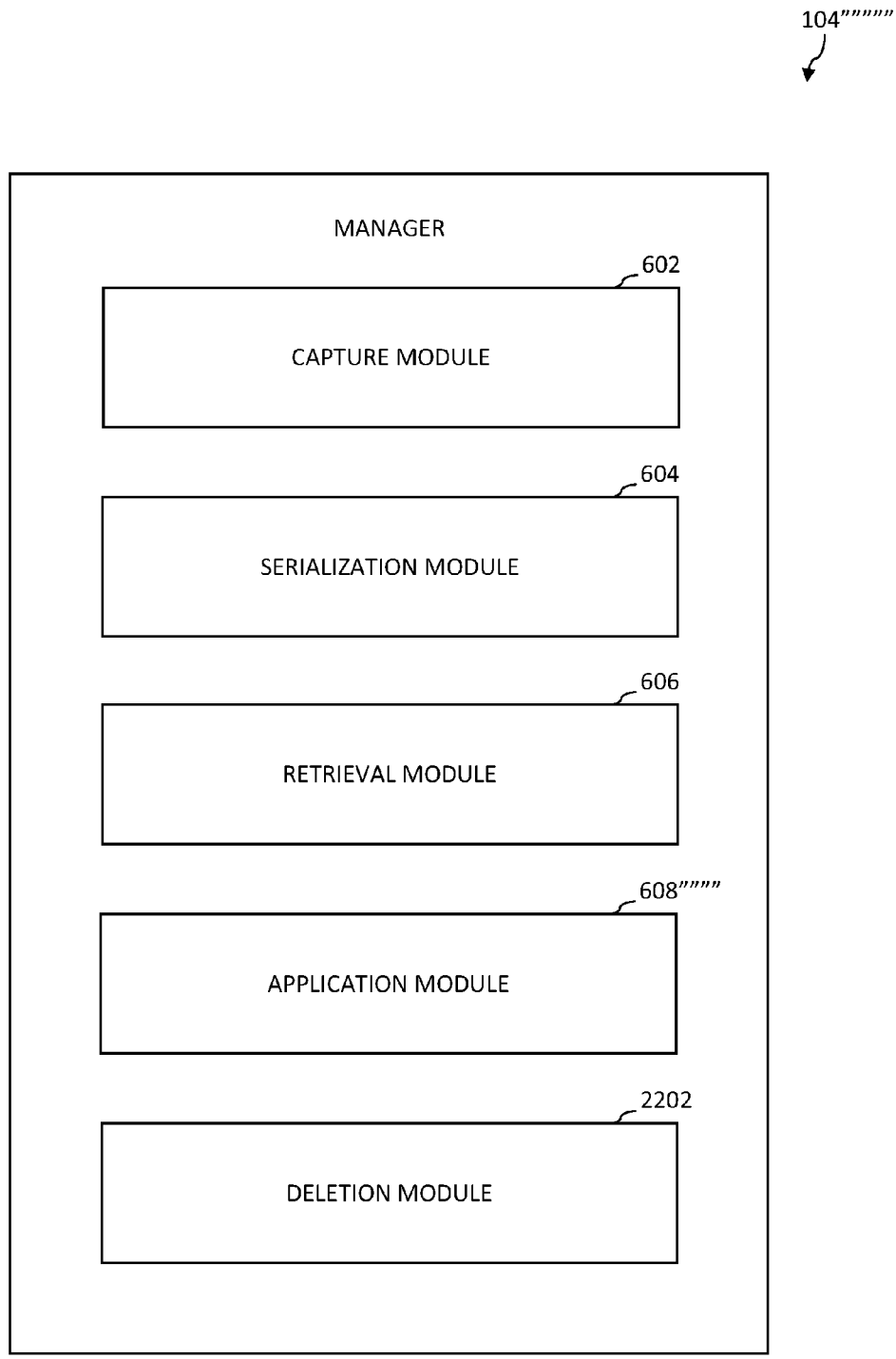

As shown in FIG. 22, manager 104'''''''' includes a capture module 602, a serialization module 604, a retrieval module 606, an application module 608'''''', and a deletion module 2202. Further structural and operational embodiments will be apparent to persons skilled in the relevant art(s) based on the discussion regarding flowchart 2100. Flowchart 2100 is described as follows.

As shown in FIG. 21, the method of flowchart 2100 begins at step 502. In step 502, a representation of a user interface customization regarding a declaratively-defined form is captured. In an example implementation, capture module 602 captures the representation of the user interface customization.

At step 504, the representation of the user interface customization is serialized to facilitate distribution thereof. In an example implementation, serialization module 604 serializes the representation of the user interface customization.

At step 506, the serialized representation of the user interface customization is retrieved. In an example implementation, retrieval module 606 retrieves the serialized representation of the user interface customization.

At step 508, the user interface customization is applied with respect to a rendering of the form in response to retrieving the serialized representation of the user interface customization. In an example implementation, application module 608'''''' applies the user interface customization with respect to the rendering of the form.

At step 2102, the representation of the user interface customization is deleted from persistent storage in response to an instruction. For example, the instruction may be received from a user. In another example, the instruction may be received from an automated system. In an example implementation, deletion module 2202 deletes the representation of the declaration user interface customization from the persistent storage.

At step 2104, the form is rendered without the user interface customization in response to deletion of the representation of the user interface customization from the persistent storage. In an example implementation, application module 608'''''' renders the form without the user interface customization. For instance, when the form is loaded in memory, application module 608'''''' may check the persistent memory to determine whether customizations regarding the form are present. If the representation of the user interface customization is not present, application module 608'''''' may render the form without the user interface customization.

Figure 23:
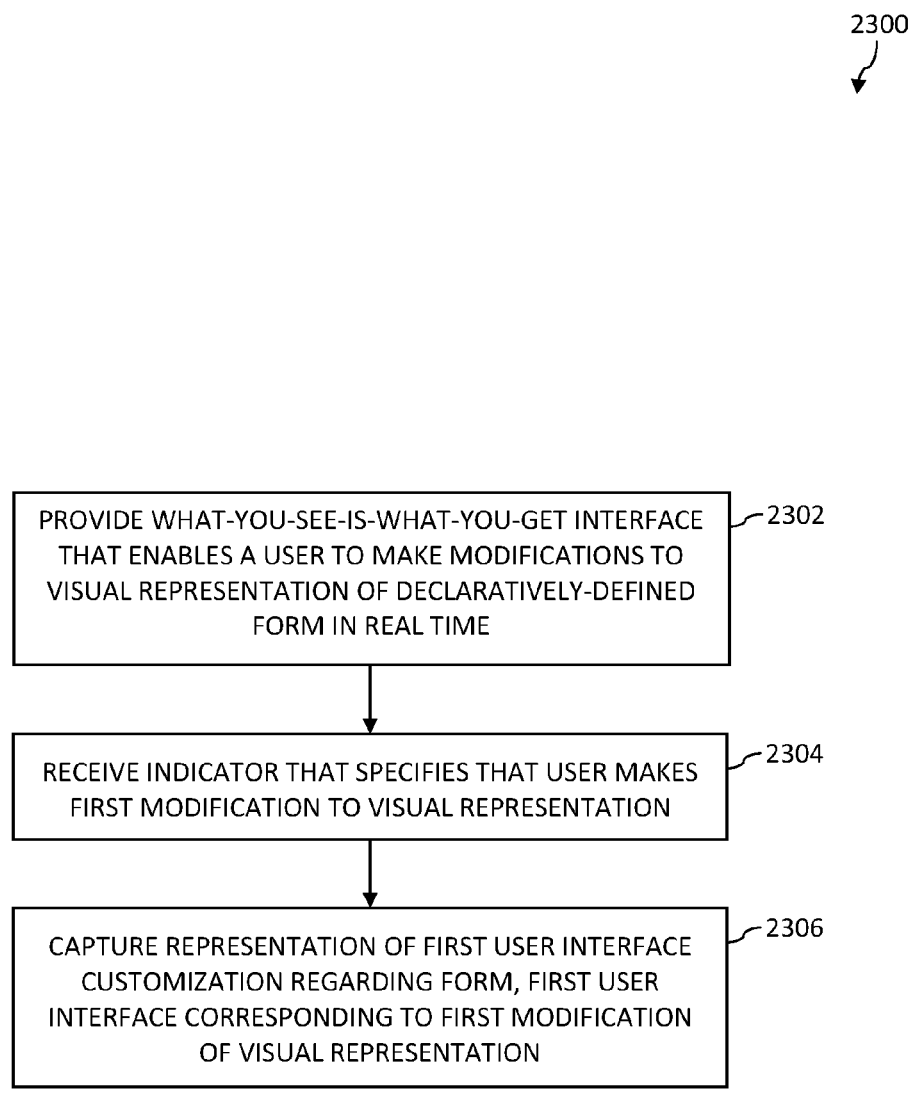

FIG. 23 depicts a flowchart 2300 of a method for customizing a form in a model-based system in accordance with an embodiment. Flowchart 2300 is described from the perspective of a manager. Flowchart 2300 may be performed by manager 104 of computer network 100 shown in FIG. 1, for example. For illustrative purposes, flowchart 2300 is described with respect to a manager 104'''''''' shown in FIG. 24, which is an example of manager 104, according to an embodiment.

Figure 24:
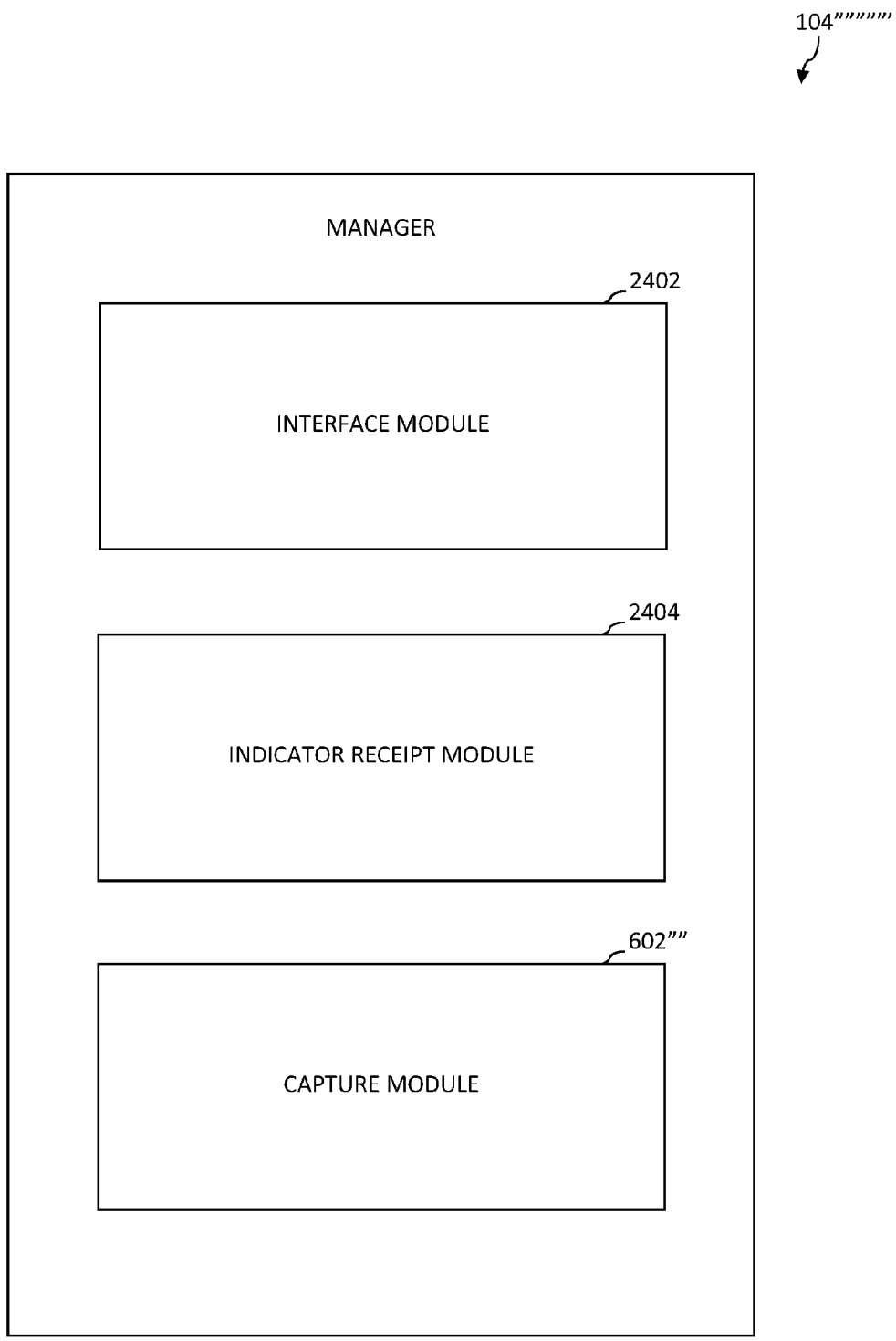

As shown in FIG. 24, manager 104'''''''' includes an interface module 2402, an indicator receipt module 2404, and a capture module 602''''. Further structural and operational embodiments will be apparent to persons skilled in the relevant art(s) based on the discussion regarding flowchart 2300. Flowchart 2300 is described as follows.

As shown in FIG. 23, the method of flowchart 2300 begins at step 2302. In step 2302, a what-you-see-is-what-you-get interface is provided that enables a user to make modifications to a visual representation of a declaratively-defined form in real time. In an example implementation, interface module 2402 provides the what-you-see-is-what-you-get interface.

At step 2304, an indicator that specifies that the user makes a first modification to the visual representation is received. In an example implementation, indicator receipt module 2404 receives the indicator.

At step 2306, a representation of a first user interface customization regarding the form is captured. The first user interface customization corresponds to the first modification of the visual representation. In an example implementation, capture module 602'''' captures the representation of the first user interface customization.

Figure 25:
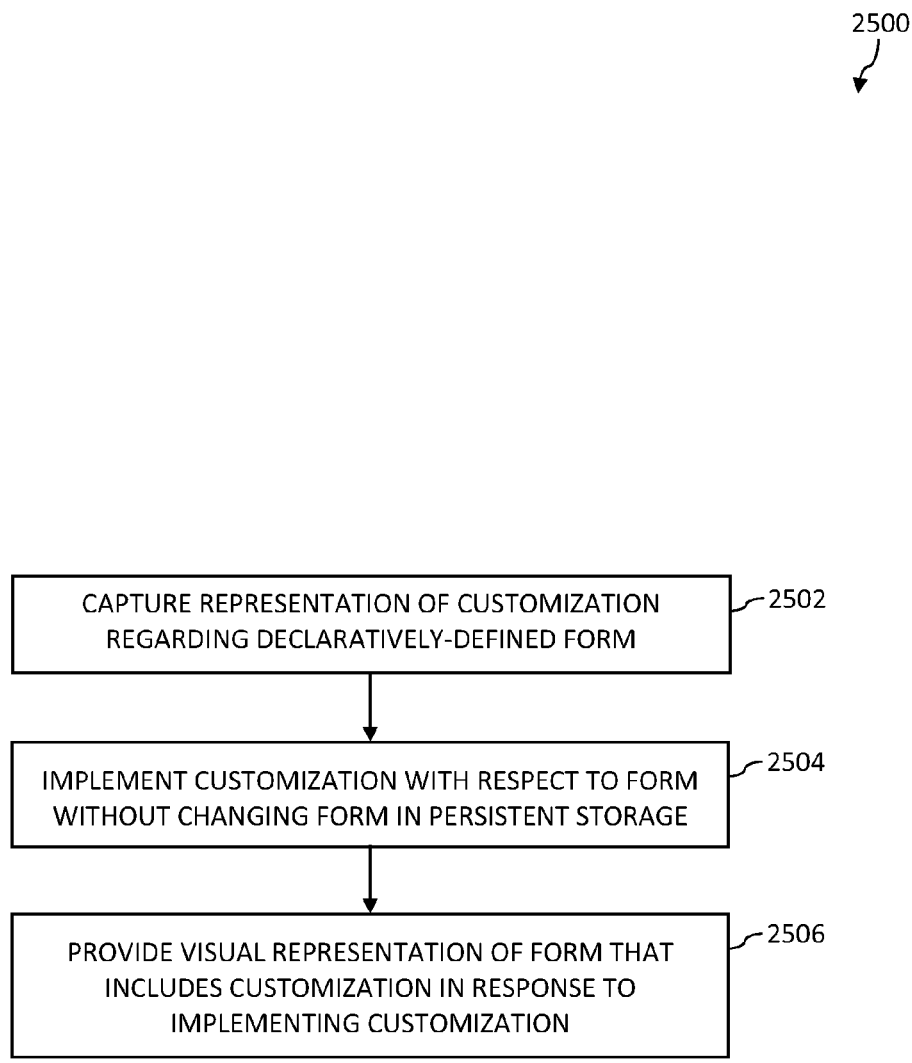

FIG. 25 depicts a flowchart 2500 of a method for customizing a form in a model-based system in accordance with an embodiment. Flowchart 2500 is described from the perspective of a manager. Flowchart 2500 may be performed by manager 104 of computer network 100 shown in FIG. 1, for example. For illustrative purposes, flowchart 2500 is described with respect to a manager 104'''''''' shown in FIG. 26, which is an example of manager 104, according to an embodiment.

Figure 26:
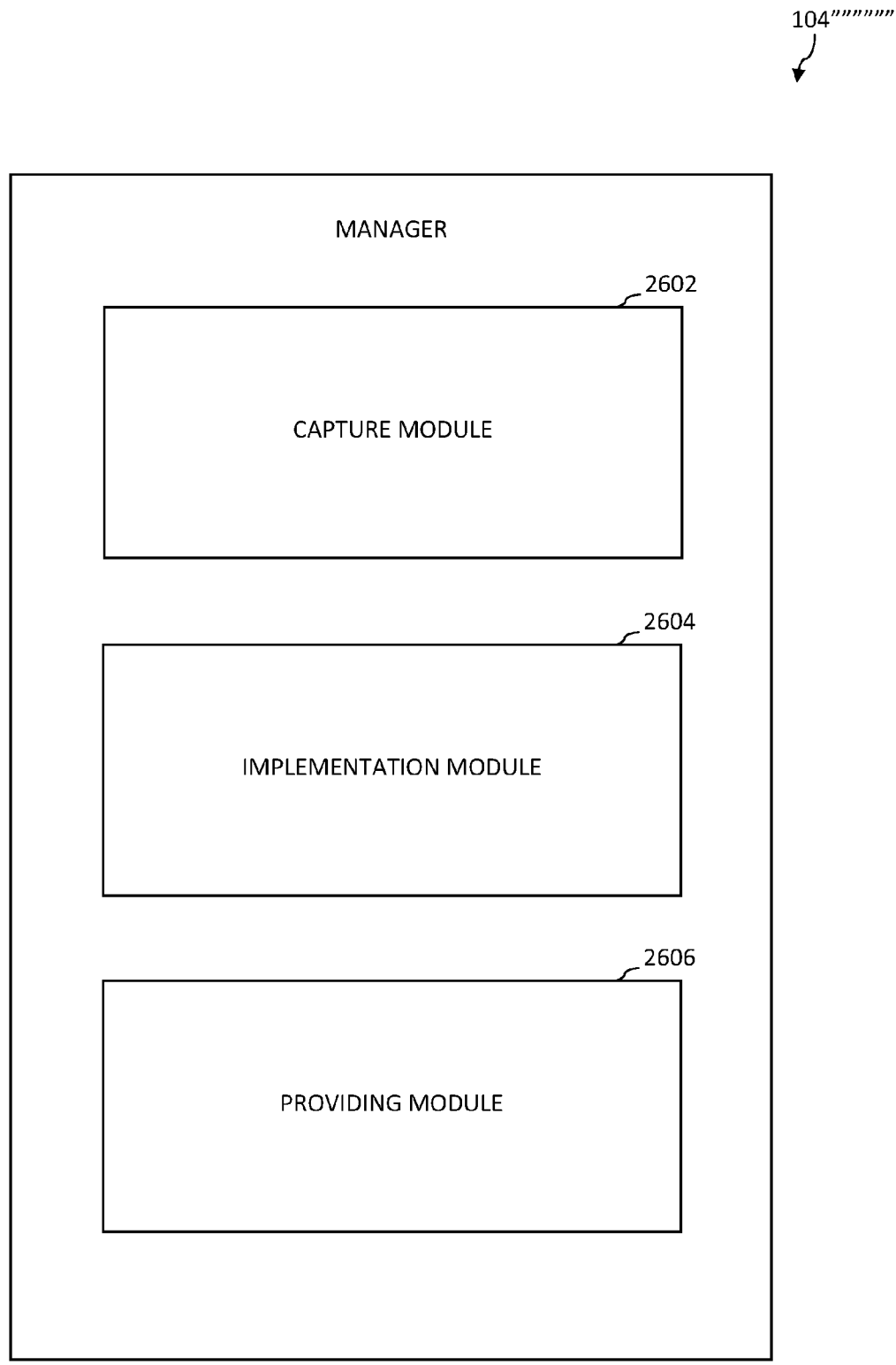

As shown in FIG. 26, manager 104'''''''' includes a capture module 2602, an implementation module 2604, and a providing module 2606. Further structural and operational embodiments will be apparent to persons skilled in the relevant art(s) based on the discussion regarding flowchart 2500. Flowchart 2500 is described as follows.

As shown in FIG. 25, the method of flowchart 2500 begins at step 2502. In step 2502, a representation of a customization regarding a declaratively-defined form is captured. In an example implementation, capture module 2602 captures the representation of the customization.

At step 2504, the customization is implemented with respect to the form without changing the form in persistent storage. In an example implementation, implementation module 2604 implements the customization with respect to the form.

At step 2506, a visual representation of the form is provided that includes the customization in response to implementing the customization. In an example implementation, providing module 2606 provides the visual representation of the form.

Figure 27:
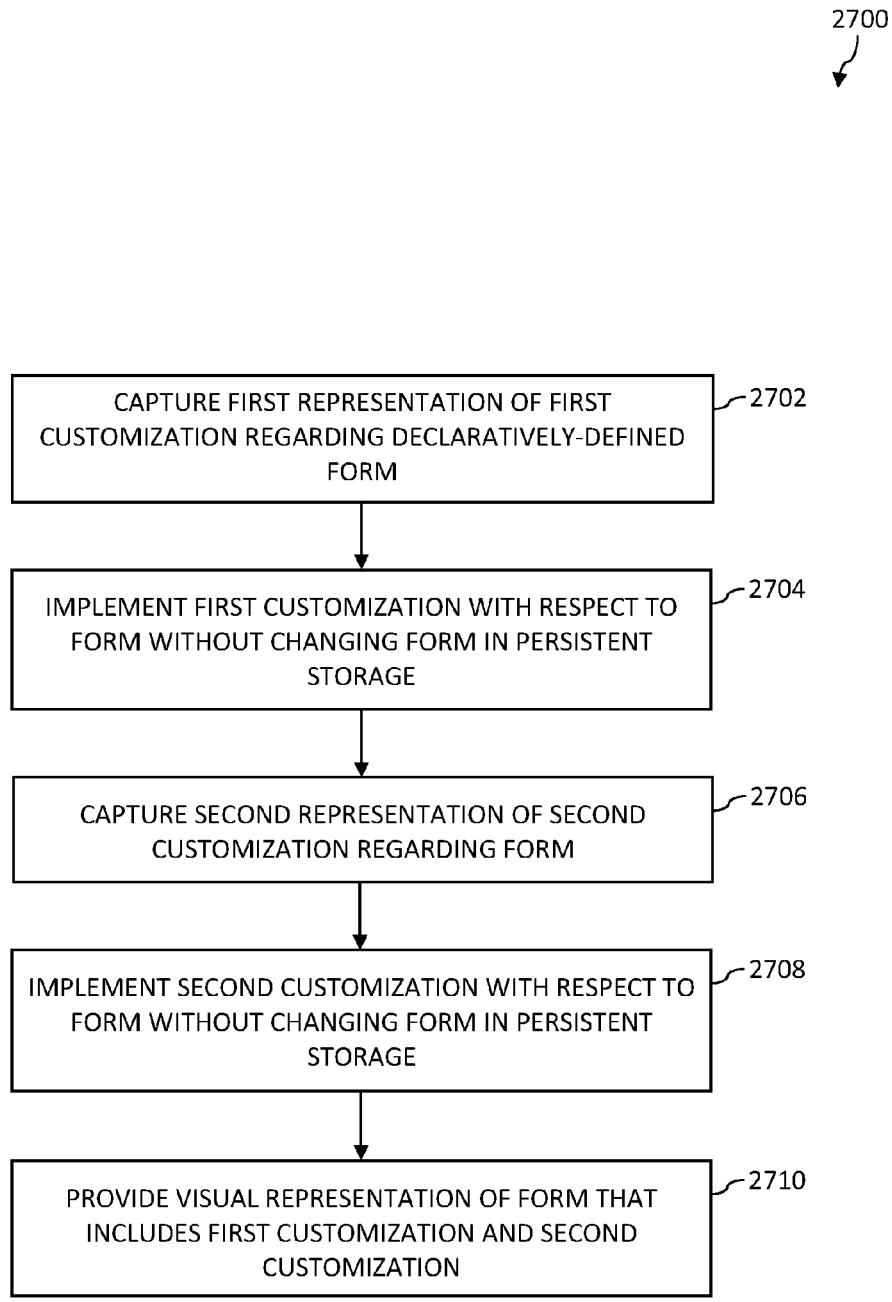

FIG. 27 depicts a flowchart 2700 of a method for customizing a form in a model-based system in accordance with an embodiment. Flowchart 2700 is described from the perspective of a manager. Flowchart 2700 may be performed by manager 104 of computer network 100 shown in FIG. 1, for example. For illustrative purposes, flowchart 2700 is described with respect to a manager 104'''''''' shown in FIG. 28, which is an example of manager 104, according to an embodiment.

Figure 28:
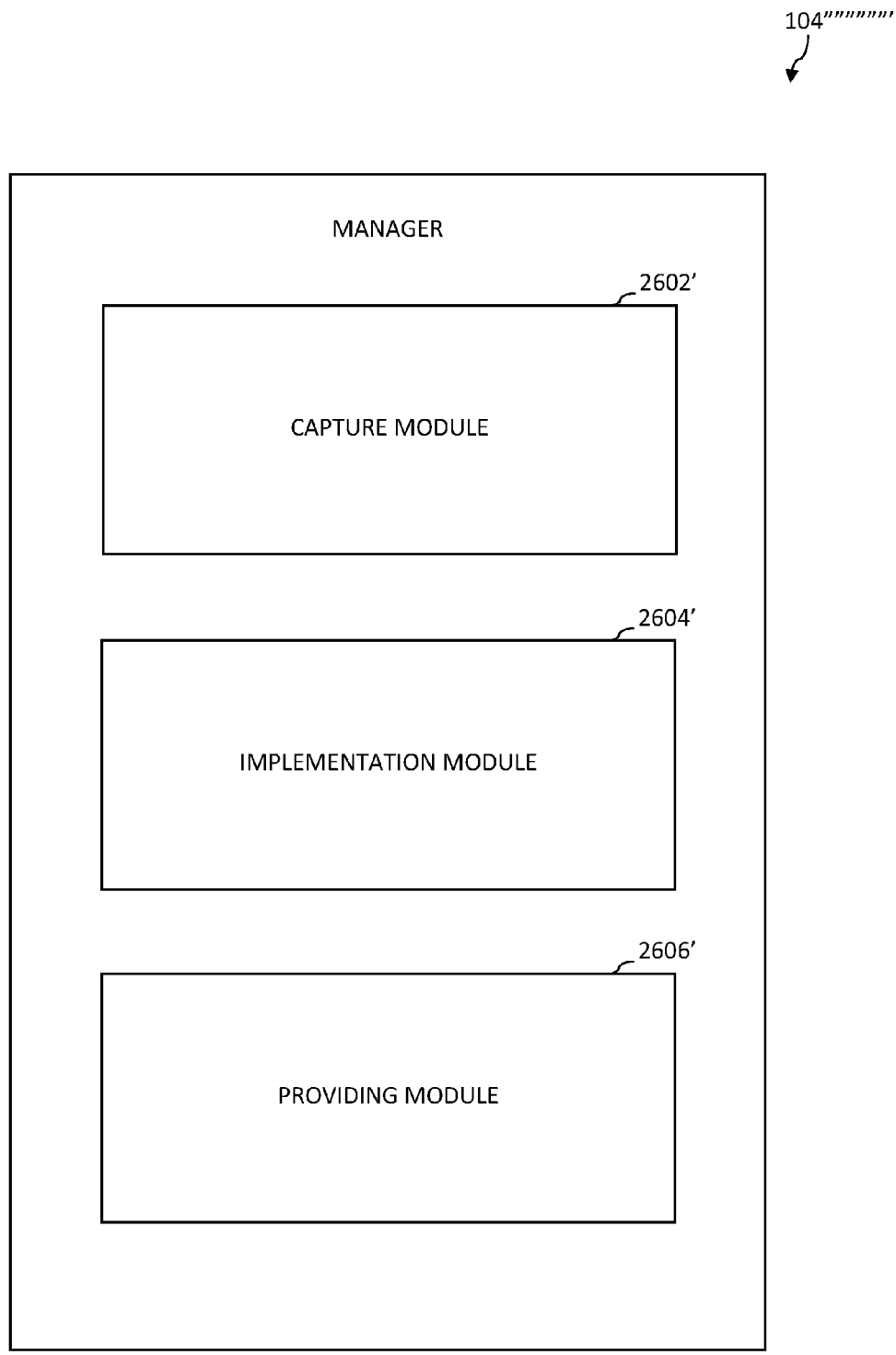

As shown in FIG. 28, manager 104'''''''' includes a capture module 2602', an implementation module 2604', and a providing module 2606'. Further structural and operational embodiments will be apparent to persons skilled in the relevant art(s) based on the discussion regarding flowchart 2700. Flowchart 2700 is described as follows.

As shown in FIG. 27, the method of flowchart 2700 begins at step 2702. In step 2702, a first representation of a first customization regarding a declaratively-defined form is captured. In an example implementation, capture module 2602' captures the first representation of the first customization.

At step 2704, the first customization is implemented with respect to the form without changing the form in persistent storage. In an example implementation, implementation module 2604' implements the first customization with respect to the form.

At step 2706, a second representation of a second customization regarding the form is captured. In an example implementation, capture module 2602' captures the second representation of the second customization.

At step 2708, the second customization is implemented with respect to the form without changing the form in the persistent storage. In an example implementation, implementation module 2604' implements the second customization with respect to the form.

At step 2710, a visual representation of the form is provided that includes the first customization and the second customization. In an example implementation, providing module 2606' provides the visual representation of the form.

FIG. 29 depicts a flowchart 2900 of a method for creating a representation of a customization regarding a form in accordance with an embodiment. Flowchart 2900 is described from the perspective of a manager. Flowchart 2900 may be performed by manager 104 of computer network 100 shown in FIG. 1, for example. For illustrative purposes, flowchart 2900 is described with respect to a manager 104'''''''' shown in FIG. 30, which is an example of manager 104, according to an embodiment.

Figure 30:
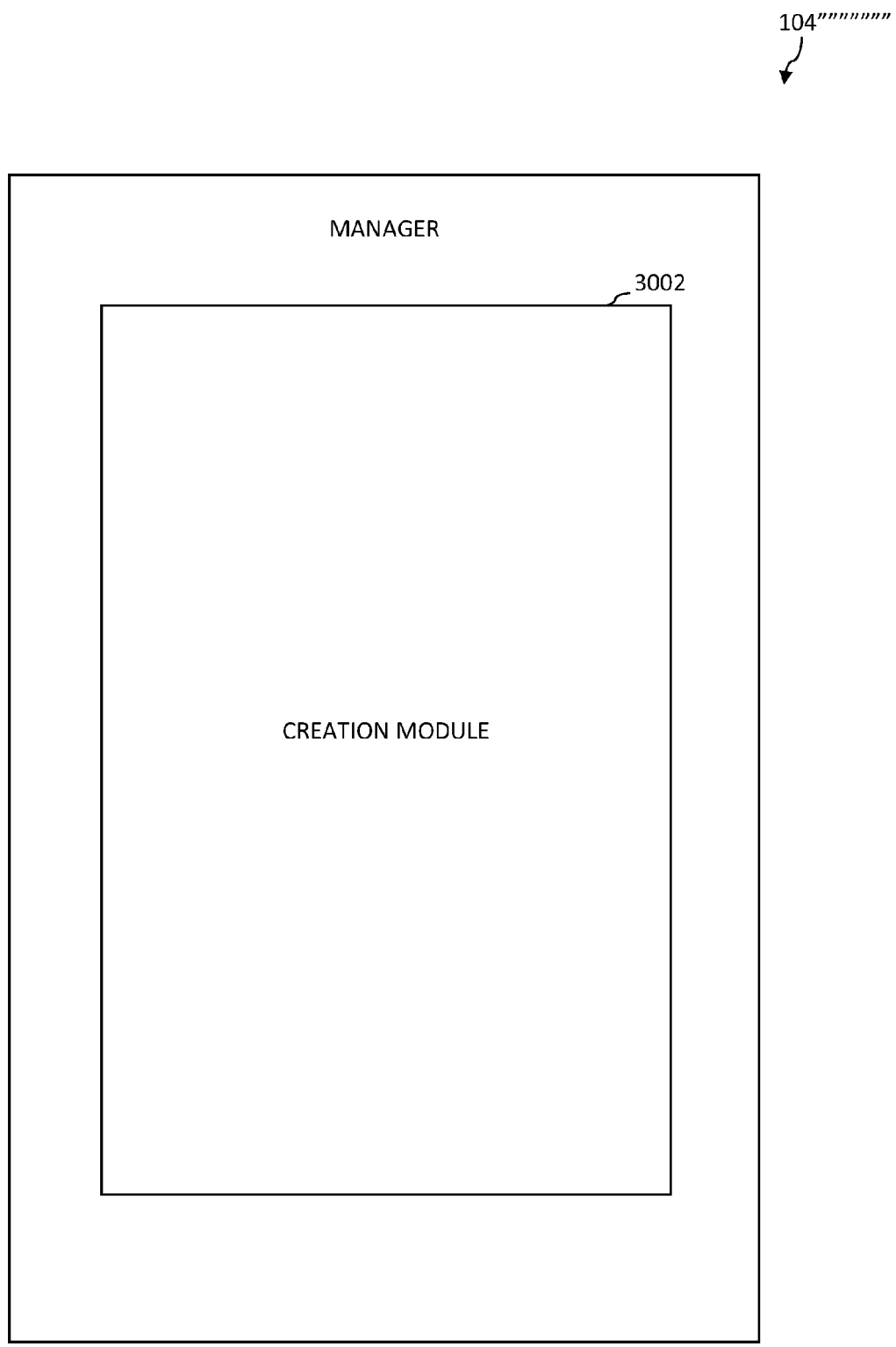

As shown in FIG. 30, manager 104'''''''' includes a creation module 3002. Further structural and operational embodiments will be apparent to persons skilled in the relevant art(s) based on the discussion regarding flowchart 2900. Flowchart 2900 is described as follows.

As shown in FIG. 29, the method of flowchart 2900 begins at step 2902. In step 2902, a representation of a customization is programmatically created based on instructions received from an automated system. For example, if a property is removed from the data model, form customization(s) that correspond to the property may be automatically removed from the representation of the customization(s). In another example, if a property is added to the data model, form customization(s) that correspond to the property may be automatically added to the representation of the customization(s). In an example implementation, creation module 3002 programmatically creates the representation of the customization.

Figure 31:
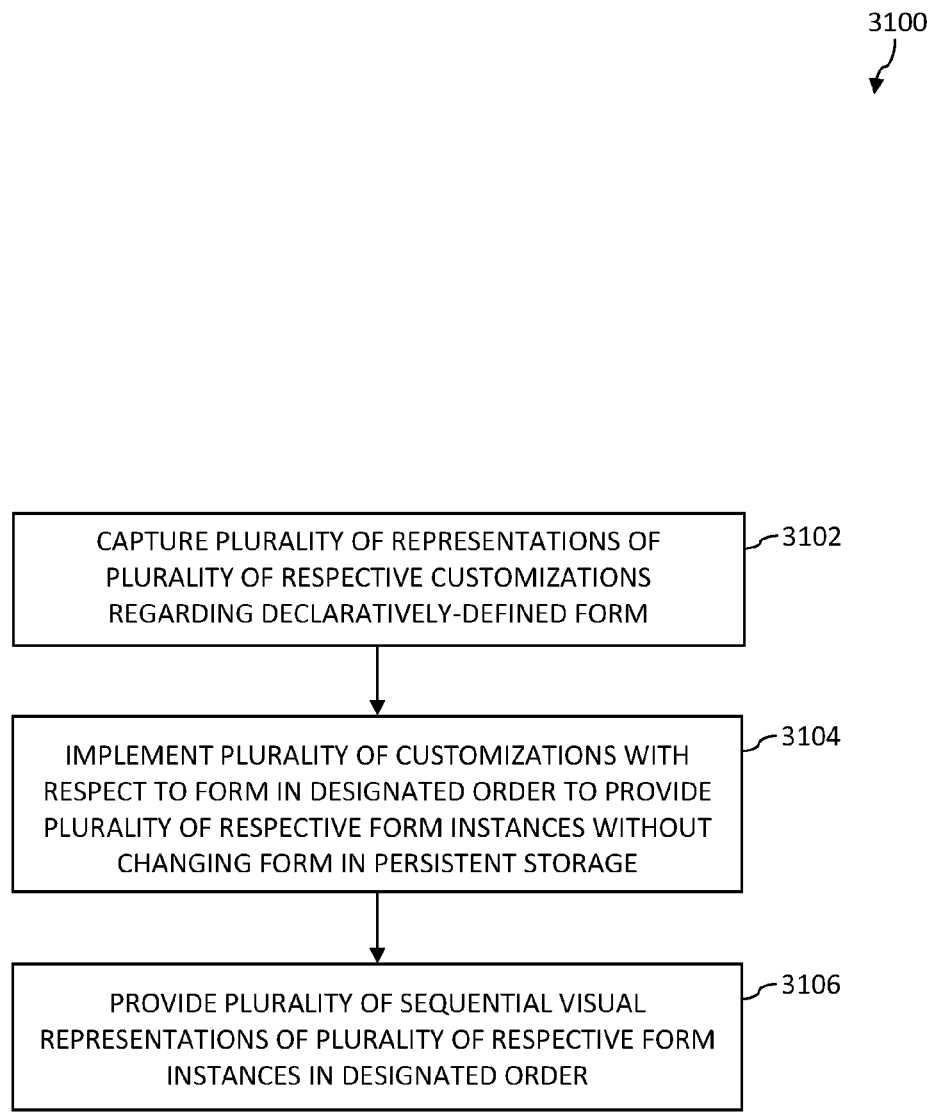

FIG. 31 depicts a flowchart 3100 of a method for customizing a form in a model-based system in accordance with an embodiment. Flowchart 3100 is described from the perspective of a manager. Flowchart 3100 may be performed by manager 104 of computer network 100 shown in FIG. 1, for example. For illustrative purposes, flowchart 3100 is described with respect to a manager 104'''''''' shown in FIG. 32, which is an example of manager 104, according to an embodiment.

Figure 32:
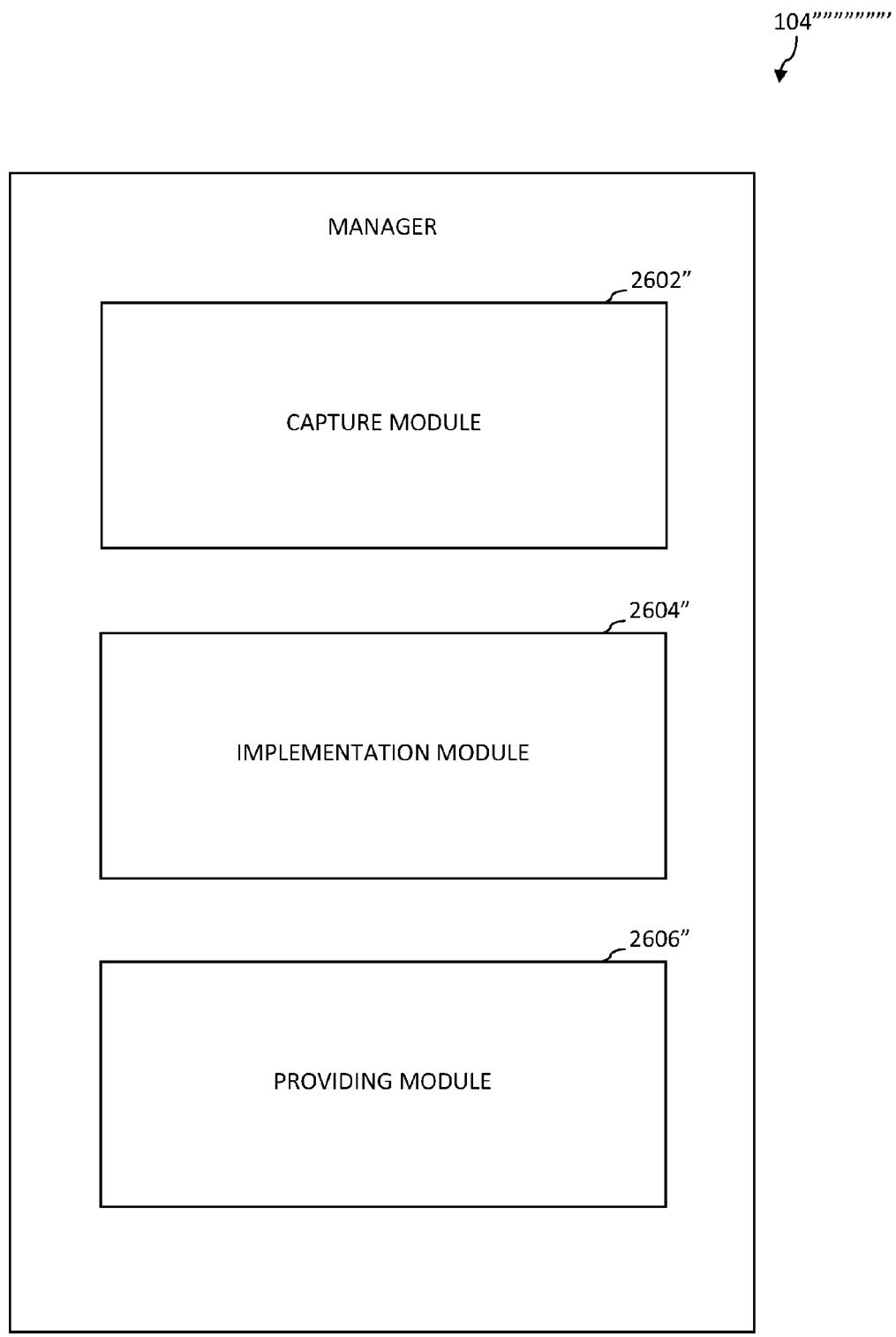

As shown in FIG. 32, manager 104'''''''' includes a capture module 2602", an implementation module 2604", and a providing module 2606". Further structural and operational embodiments will be apparent to persons skilled in the relevant art(s) based on the discussion regarding flowchart 3100. Flowchart 3100 is described as follows.

As shown in FIG. 31, the method of flowchart 3100 begins at step 3102. In step 3102, a plurality of representations of a plurality of respective customizations regarding a declaratively-defined form is captured. In an example implementation, capture module 2602" captures the plurality of representations of the plurality of respective customizations.

At step 3104, the plurality of customizations is implemented with respect to the form in a designated order to provide a plurality of respective form instances without changing the form in persistent storage. A form instance is a version of the form that includes a designated number of the plurality of customizations in accordance with the designated order. For example, a first form instance may include a first customization. A second form instance may include the first customization and a second customization that is applied after the first customization. A third form instance may include the first customization, the second customization applied after the first customization, and a third customization that is applied after the second customization, and so on. In an example implementation, implementation module 2604" implements the plurality of customizations with respect to the form.

At step 3106, a plurality of sequential visual representations of the plurality of respective form instances is provided in the designated order. In an example implementation, providing module 2606" provides the plurality of sequential visual representations of the plurality of respective form instances in the designated order.

FIG. 33 depicts an example computer 3300 in which embodiments may be implemented. Any one or more of the admin system 102, database 106, clients 108A-108N, or manager 104 shown in FIG. 1 (or any one or more subcomponents thereof shown in FIGS. 4, 6, 8, 10, 12, 14, 16, 18, 20, 22, 24, 26, 28, 30, and 32) may be implemented using computer 3300, including one or more features of computer 3300 and/or alternative features. Computer 3300 may be a general-purpose computing device in the form of a conventional personal computer, a mobile computer, or a workstation, for example, or computer 3300 may be a special purpose computing device. The description of computer 3300 provided herein is provided for purposes of illustration, and is not intended to be limiting. Embodiments may be implemented in further types of computer systems, as would be known to persons skilled in the relevant art(s).

As shown in FIG. 33, computer 3300 includes a processing unit 3302, a system memory 3304, and a bus 3306 that couples various system components including system memory 3304 to processing unit 3302. Bus 3306 represents one or more of any of several types of bus structures, including a memory bus or memory controller, a peripheral bus, an accelerated graphics port, and a processor or local bus using any of a variety of bus architectures. System memory 3304 includes read only memory (ROM) 3308 and random access memory (RAM) 3310. A basic input/output system 3312 (BIOS) is stored in ROM 3308.

Computer 3300 also has one or more of the following drives: a hard disk drive 3314 for reading from and writing to a hard disk, a magnetic disk drive 3316 for reading from or writing to a removable magnetic disk 3318, and an optical disk drive 3320 for reading from or writing to a removable optical disk 3322 such as a CD ROM, DVD ROM, or other optical media. Hard disk drive 3314, magnetic disk drive 3316, and optical disk drive 3320 are connected to bus 3306 by a hard disk drive interface 3324, a magnetic disk drive interface 3326, and an optical drive interface 3328, respectively. The drives and their associated computer-readable storage media provide nonvolatile storage of computer-readable instructions, data structures, program modules and other data for the computer. Although a hard disk, a removable magnetic disk and a removable optical disk are described, other types of computer-readable media can be used to store data, such as flash memory cards, digital video disks, random access memories (RAMs), read only memories (ROM), and the like.

A number of program modules may be stored on the hard disk, magnetic disk, optical disk, ROM, or RAM. These programs include an operating system 3330, one or more application programs 3332, other program modules 3334, and program data 3336. Application programs 3332 or program modules 3334 may include, for example, computer program logic for implementing any one or more of applications 110A-110N, form customization module 112, validation module 402, serialization module 404, providing module 406, capture module 602, serialization module 604, retrieval module 606, application module 608, capture module 602', serialization module 604', retrieval module 606', application module 608', import module 802, capture module 602", application module 608", order determination module 1002, application module 608''', order determination module 1002', application module 608'''', inquiry module 1402, indication receipt module 1404, application module 608''''', assignment module 1602, capture module 602''', serialization module 604'', retrieval module 606'', application module 608'''''', application module 608''''''', form receipt module 2002, application module 608'''''''', deletion module 2202, interface module 2402, indicator receipt module 2404, capture module 602'''', capture module 2602, implementation module 2604, providing module 2606, capture module 2602', implementation module 2604', providing module 2606', creation module 3002, capture module 2602", implementation module 2604", providing module 2606", flowchart 300 (including any step of flowchart 300), flowchart 500 (including any step of flowchart 500), flowchart 700 (including any step of flowchart 700), flowchart 900 (including any step of flowchart 900), flowchart 1100 (including any step of flowchart 1100), flowchart 1300 (including any step of flowchart 1300), flowchart 1500 (including any step of flowchart 1500), flowchart 1700 (including any step of flowchart 1700), flowchart 1900 (including any step of flowchart 1900), flowchart 2100 (including any step of flowchart 2100), flowchart 2300 (including any step of flowchart 2300), flowchart 2500 (including any step of flowchart 2500), flowchart 2700 (including any step of flowchart 2700), flowchart 2900 (including any step of flowchart 2900), and/or flowchart 3100 (including any step of flowchart 3100), as described herein.

A user may enter commands and information into the computer 3300 through input devices such as keyboard 3338 and pointing device 3340. Other input devices (not shown) may include a microphone, joystick, game pad, satellite dish, scanner, or the like. These and other input devices are often connected to the processing unit 3302 through a serial port interface 3342 that is coupled to bus 3306, but may be connected by other interfaces, such as a parallel port, game port, or a universal serial bus (USB).

A monitor 3344 or other type of display device is also connected to bus 3306 via an interface, such as a video adapter 3346. In addition to the monitor, computer 3300 may include other peripheral output devices (not shown) such as speakers and printers.

Computer 3300 is connected to a network 3348 (e.g., the Internet) through a network interface or adapter 3350, a modem 3352, or other means for establishing communications over the network. Modem 3352, which may be internal or external, is connected to bus 3306 via serial port interface 3342.

As used herein, the terms "computer program medium" and "computer-readable medium" are used to generally refer to media such as the hard disk associated with hard disk drive 3314, removable magnetic disk 3318, removable optical disk 3322, as well as other media such as flash memory cards, digital video disks, random access memories (RAMs), read only memories (ROM), and the like.

As noted above, computer programs and modules (including application programs 3332 and other program modules 3334) may be stored on the hard disk, magnetic disk, optical disk, ROM, or RAM. Such computer programs may also be received via network interface 3350 or serial port interface 3342. Such computer programs, when executed or loaded by an application, enable computer 3300 to implement features of embodiments discussed herein. Accordingly, such computer programs represent controllers of the computer 3300.

Example embodiments are also directed to computer program products comprising software (e.g., computer-readable instructions) stored on any computer useable medium. Such software, when executed in one or more data processing devices, causes a data processing device(s) to operate as described herein. Embodiments may employ any computer-useable or computer-readable medium, known now or in the future. Examples of computer-readable mediums include, but are not limited to storage devices such as RAM, hard drives, floppy disks, CD ROMs, DVD ROMs, zip disks, tapes, magnetic storage devices, optical storage devices, MEMS-based storage devices, nanotechnology-based storage devices, and the like.

III. Conclusion

While various embodiments have been described above, it should be understood that they have been presented by way of example only, and not limitation. It will be apparent to persons skilled in the relevant art(s) that various changes in form and details can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A method comprising:
    capturing a representation of a first customization of a form without modifying the form in persistent memory and without creating a modified version of the form in persistent storage;
    serializing the representation of the first customization to facilitate distribution of the representation; and
    rendering the form in a customized state in response to an instruction to render the form by:
        retrieving the form, which is not modified in the persistent memory, and the serialized representation of the first customization; and
        applying the first customization with respect to a rendering of the form that is retrieved from the persistent memory using one or more processors in response to retrieving the serialized representation of the first customization to render the form in the customized state without modifying the form in persistent memory.

2. The method of claim 1, wherein capturing the representation of the first customization comprises:
    capturing the representation of the first customization in a portable format.

3. The method of claim 1, wherein capturing the representation of the first customization, serializing the representation of the first customization, retrieving the serialized representation of the first customization, and applying the first customization are performed in the context of a test environment, the method further comprising:
    importing the representation of the first customization to a production environment in response to applying the first customization in the context of the test environment;
    serializing the representation of the first customization in a context of the production environment;
    retrieving the serialized representation of the first customization in the context of the production environment; and
    applying the first customization with respect to a rendering of the form in the context of the production environment in response to retrieving the serialized representation of the first customization in the context of the production environment.

4. The method of claim 1, further comprising:
    capturing a representation of a second customization regarding the form; and
    determining that capturing the representation of the first customization is performed after capturing the representation of the second customization;
    wherein applying the first customization with respect to the rendering of the form is performed in response to determining that capturing the representation of the first customization is performed after capturing the representation of the second customization.

5. The method of claim 1, further comprising:
    capturing a representation of a second customization regarding the form; and
    determining that a most recent modification of the representation of the second customization precedes a most recent modification of the representation of the first customization;
    wherein applying the first customization with respect to the rendering of the form is performed in response to determining that the most recent modification of the representation of the second customization precedes the most recent modification of the representation of the first customization.

6. The method of claim 1, further comprising:
    capturing a representation of a second customization regarding the form;
    providing an inquiry to a user to select the first customization or the second customization; and
    receiving an indication that the user selects the first customization;
    wherein applying the first customization with respect to the rendering of the form is performed in response to receiving the indication.

7. The method of claim 1, further comprising:
    capturing a representation of a second customization regarding the form;
    assigning a first priority that is greater than a second priority to the representation of the first customization; and
    assigning the second priority to the representation of the second customization;
    wherein applying the first customization with respect to the rendering of the form is performed in response to the first priority being greater than the second priority.

8. The method of claim 1, wherein capturing the representation of the first customization comprises:
    capturing a plurality of representations of a plurality of respective customizations regarding the form;
    wherein applying the first customization with respect to the rendering of the form comprises:
        applying the plurality of customizations with respect to the rendering of the form in an order that is based on a plurality of hierarchical classes of a class hierarchy to which the plurality of respective customizations is targeted.

9. The method of claim 1, wherein the representation of the first customization is human understandable.

10. A manager comprising:
    a capture module configured to capture a representation of a first customization of a form without modifying the form in persistent memory;
    a serialization module configured to serialize the representation of the first customization to facilitate distribution of the representation;
    a retrieval module configured to retrieve the form, which is not modified in the persistent memory, and the serialized representation of the first customization in response to an instruction to render the form; and
    an application module configured to apply the first customization with respect to a rendering of the form that is retrieved from the persistent memory based on retrieval of the serialized representation of the first customization to render the form in a customized state without modifying the form in persistent memory.

11. The manager of claim 10, further comprising:
    a form receipt module configured to receive a modified version of the form;
    wherein the application module is further configured to apply the first customization with respect to a rendering of the modified version of the form to an extent that the first customization is applicable to the modified version.

12. The manager of claim 10, further comprising:
    a deletion module configured to delete the representation of the first customization from persistent storage in response to an instruction;
    wherein the application module is further configured to render the form without the first customization in response to deletion of the representation of the first customization from the persistent storage.

13. The manager of claim 10, further comprising:
an interface module configured to provide a what-you-see-is-what-you-get interface that enables a user to make modifications to a visual representation of the form in real time; and
an indicator receipt module configured to receive an indicator that specifies that the user makes a first modification to the visual representation;
wherein the first customization corresponds to the first modification of the visual representation.

14. The manager of claim 10, wherein the representation of the first customization is a management pack.

15. A method comprising:
capturing a representation of a first customization of a form without modifying the form in persistent memory;
implementing the first customization with respect to the form using one or more processors without changing the form and without creating a modified version of the form in persistent storage, including changing values of respective properties that are associated with the form to implement the first customization; and
providing a visual representation of the form that includes the first customization implemented with respect to the form from the persistent memory in response to implementing the first customization to render the form in a customized state without modifying the form in persistent memory.

16. The method of claim 15, further comprising:
capturing a second representation of a second customization regarding the form; and
implementing the second customization with respect to the form without changing the form in the persistent storage;
wherein providing the visual representation of the form comprises:
providing the visual representation of the form that further includes the second customization.

17. The method of claim 15, further comprising:
programmatically creating the first representation of the first customization automatically based on logic programmed into a processing system that includes the one or more processors.

18. The method of claim 15, wherein capturing the representation of the first customization comprises:
capturing a plurality of representations of a plurality of respective customizations regarding the form;
wherein implementing the first customization with respect to the form comprises:
implementing the plurality of customizations with respect to the form in a designated order to provide a plurality of respective form instances without changing the form in the persistent storage; and
wherein providing the visual representation of the form comprises:
providing a plurality of sequential visual representations of the plurality of respective form instances in the designated order.

19. The method of claim 15, wherein the representation of the first customization is a management pack.

20. The method of claim 15, further comprising:
capturing a second representation of a second customization regarding the form, wherein the representation of the first customization comprises a first version, and wherein the second representation of the second customization comprises a second version; and
overwriting the first version with the second version.

* * * * *